United States Patent
Sharma et al.

(10) Patent No.: US 12,197,007 B2
(45) Date of Patent: Jan. 14, 2025

(54) MULTI-LAYERED OPTICAL INTEGRATED CIRCUIT ASSEMBLY WITH A MONOCRYSTALLINE WAVEGUIDE AND LOWER CRYSTALLINITY BONDING LAYER

(71) Applicant: Intel Corporation, Santa Clara, CA (US)

(72) Inventors: Abhishek A. Sharma, Hillsboro, OR (US); Wilfred Gomes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 17/397,352

(22) Filed: Aug. 9, 2021

(65) Prior Publication Data
US 2023/0044697 A1 Feb. 9, 2023

(51) Int. Cl.
*G02B 6/132* (2006.01)
*G02B 6/136* (2006.01)
*G02B 6/12* (2006.01)

(52) U.S. Cl.
CPC ............. *G02B 6/132* (2013.01); *G02B 6/136* (2013.01); *G02B 2006/12061* (2013.01); *G02B 2006/12188* (2013.01)

(58) Field of Classification Search
CPC .... G02B 6/132; G02B 6/136; G02B 6/12002; G02B 2006/12061; G02B 2006/12188; H01L 27/092
See application file for complete search history.

(56) References Cited

U.S. PATENT DOCUMENTS

| | | | | |
|---|---|---|---|---|
| 6,965,128 B2* | 11/2005 | Holm | ................. | H01L 21/8258 385/11 |
| 8,620,164 B2* | 12/2013 | Heck | ...................... | H01S 5/021 372/39 |
| 9,224,882 B2* | 12/2015 | Na | ..................... | G02B 6/12004 |
| 9,341,776 B2* | 5/2016 | Iizuka | ................... | H01S 5/0264 |
| 9,529,150 B2* | 12/2016 | Orcutt | ................... | G02B 6/132 |
| 9,831,374 B2* | 11/2017 | Vincent | ............ | H01L 31/02327 |
| 9,946,022 B2* | 4/2018 | Orcutt | ................... | G02B 6/122 |
| 10,514,504 B2* | 12/2019 | Orcutt | ................... | G02B 6/122 |
| 10,725,324 B2* | 7/2020 | Hassan | .................. | G02F 1/025 |

(Continued)

FOREIGN PATENT DOCUMENTS

EP 2685297 A1 1/2014

OTHER PUBLICATIONS

"Adhesive bonding of Semiconductor Wafers", Wikipedia, Jun. 30, 2021, pp. 1-11; Retrieved from the Internet: https://en.wikipedia.org/wiki/Adhesive_bonding_of_semiconductor_wafers [retrieved on Nov. 23, 2022].

*Primary Examiner* — Andrew Jordan
(74) *Attorney, Agent, or Firm* — Akona IP PC

(57) ABSTRACT

Described herein are stacked photonic integrated circuit (PIC) assemblies that include multiple layers of waveguides. The waveguides are formed of substantially monocrystalline materials, which cannot be repeatedly deposited. Layers of monocrystalline material are fabricated and repeatedly transferred onto the PIC structure using a layer transfer process, which involves bonding a monocrystalline material using a non-monocrystalline bonding material. Layers of isolation materials are also deposited or layer transferred onto the PIC assembly.

20 Claims, 12 Drawing Sheets

(56) References Cited

U.S. PATENT DOCUMENTS

| | | | |
|---|---|---|---|
| 10,768,368 B2* | 9/2020 | Orcutt | G02B 6/132 |
| 11,862,928 B2* | 1/2024 | Hassan | H01S 5/1231 |
| 2003/0015720 A1 | 1/2003 | Lian et al. | |
| 2003/0017625 A1* | 1/2003 | Litvin | H01L 27/0605 |
| | | | 438/455 |
| 2003/0026311 A1* | 2/2003 | Barenburg | G02B 6/12004 |
| | | | 372/50.1 |
| 2003/0030062 A1* | 2/2003 | Holm | H01S 5/026 |
| | | | 257/79 |
| 2004/0150043 A1* | 8/2004 | Holm | H01L 21/8258 |
| | | | 257/E27.012 |
| 2014/0044391 A1* | 2/2014 | Iizuka | H01L 31/173 |
| | | | 438/24 |
| 2015/0125111 A1* | 5/2015 | Orcutt | G02B 6/12004 |
| | | | 438/701 |
| 2015/0140720 A1* | 5/2015 | Collins | G02B 6/13 |
| | | | 438/65 |
| 2016/0300972 A1* | 10/2016 | Vincent | H01L 31/105 |
| 2017/0146740 A1* | 5/2017 | Orcutt | G02B 6/12004 |
| 2018/0180811 A1* | 6/2018 | Orcutt | G02B 6/12004 |
| 2020/0026105 A1* | 1/2020 | Hassan | H01S 5/026 |
| 2020/0081184 A1* | 3/2020 | Orcutt | G02B 6/136 |
| 2021/0036488 A1* | 2/2021 | Hassan | H01S 5/1231 |
| 2021/0072460 A1* | 3/2021 | Zhang | G02F 1/025 |
| 2021/0141154 A1 | 5/2021 | Razdan et al. | |
| 2022/0187536 A1* | 6/2022 | Sharma | H01L 23/66 |
| 2022/0373734 A1* | 11/2022 | Duong | H01L 23/3121 |
| 2022/0416097 A1* | 12/2022 | Kohen | G02B 6/12 |
| 2023/0044331 A1* | 2/2023 | Sharma | H01L 25/167 |
| 2023/0044697 A1* | 2/2023 | Sharma | G02B 6/132 |
| 2023/0075255 A1* | 3/2023 | Heck | H01S 5/021 |
| 2023/0420911 A1* | 12/2023 | Menezo | H01S 5/026 |

* cited by examiner

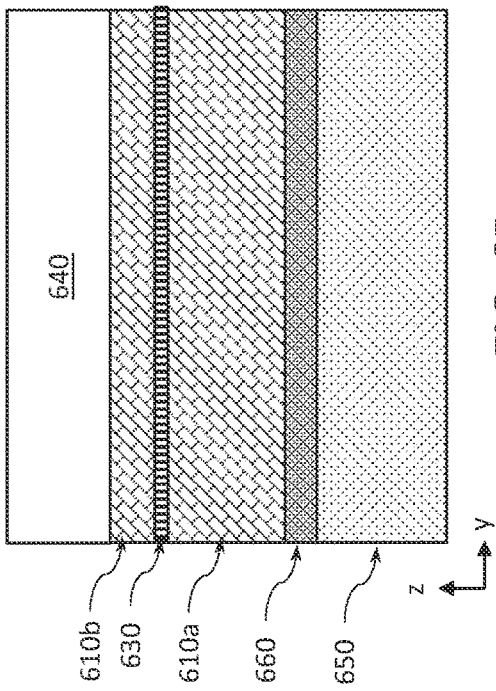
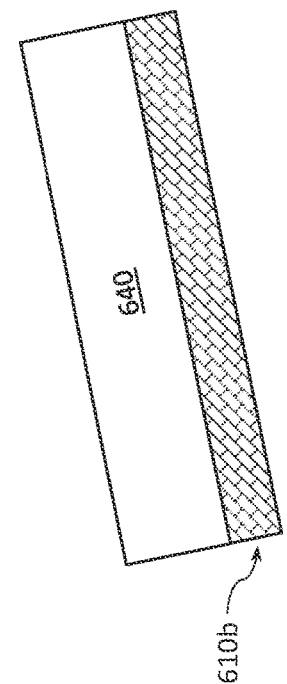
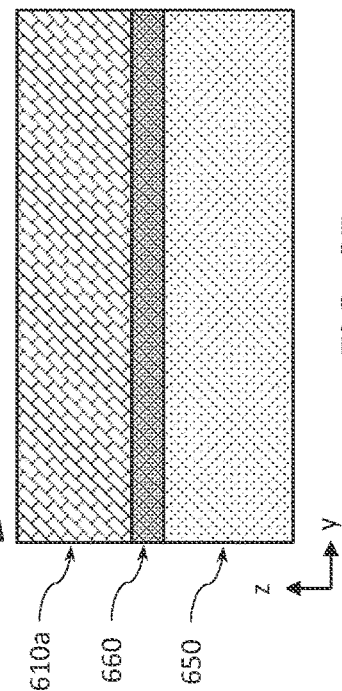
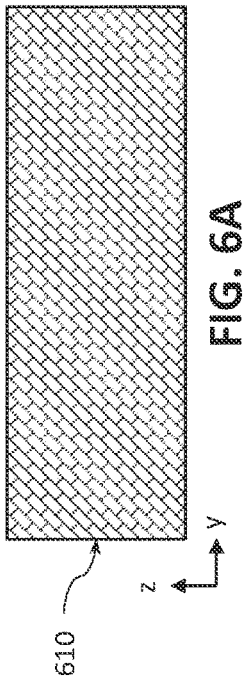
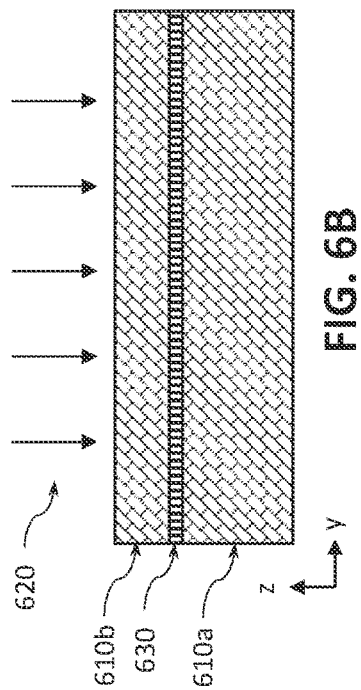

MULTI-LAYERED OPTICAL INTEGRATED CIRCUIT ASSEMBLY WITH A MONOCRYSTALLINE WAVEGUIDE AND LOWER CRYSTALLINITY BONDING LAYER

TECHNICAL FIELD

This disclosure relates generally to the field of integrated circuit (IC) manufacturing, and more specifically, to integrated circuit assemblies that include photonic components in multiple layers.

BACKGROUND

The need for fast and efficient photonics-based technologies is increasing, e.g., as internet data traffic growth rate is overtaking voice traffic, pushing the need for optical communications. In optical communications, information is transmitted by way of an optical carrier whose frequency is typically in the visible or near-infrared region of the electromagnetic spectrum. A carrier with such a high frequency is sometimes referred to as an optical signal, an optical carrier, a light wave signal, or simply light.

Technological advances today enable implementing portions of some photonic components at the IC (or chip) level, which provides advantages for use of optical communications in computer systems. For example, an optical receiver used in an optical communication system may include a photodetector (PD) implemented on a chip. A photonic integrated circuit (photonic IC (PIC)) is a device that integrates photonic functions for information signals imposed on electromagnetic waves, e.g., electromagnetic waves of optical wavelengths. PICs find application in fiber-optic communication, medical, security, sensing, and photonic computing systems. However, photonic components are larger than typical electronic component, and it can be challenging to fit components in a PIC.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 6A-6E illustrate an example layer transfer process for forming an IC assembly with multiple stacked optical layers.

DETAILED DESCRIPTION

Overview

Figure 1:
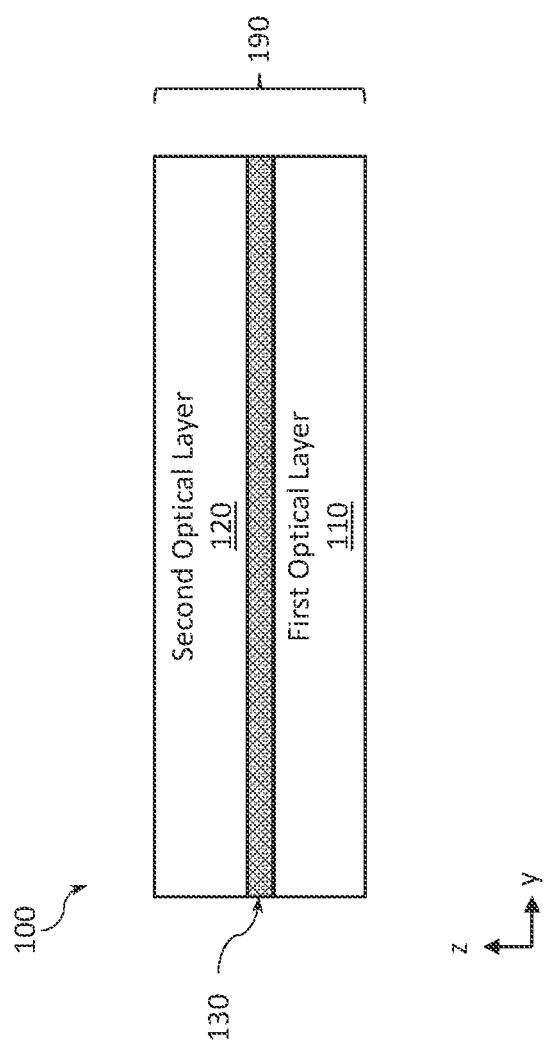
FIG. 1 provides a schematic illustration of an IC assembly with multiple stacked optical layers, according to some embodiments of the present disclosure.

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

For purposes of illustrating IC assemblies that include multiple stacked optical layers as described herein it might be useful to first understand phenomena that may come into play during IC fabrication. The following foundational information may be viewed as a basis from which the present disclosure may be properly explained. Such information is offered for purposes of explanation only and, accordingly, should not be construed in any way to limit the broad scope of the present disclosure and its potential applications.

One challenge resides in PICs is that, given a usable surface area of a substrate, there are only so many optical components that can be formed in that area, placing a significant limitation on the density of optical structures. In a PIC, signals are transmitted using waveguides that propagate light. Waveguides are wider than metal lines (e.g., copper wires) for transmitting electrical signals in electronic-based processing, and it is difficult to reduce their size and maintain functionality.

In electronic circuits, metal, semiconductor, and insulating materials may be deposited in multiple layers to produce stacked structures. Optical structures cannot be built in layers in the same way. In order to propagate light, waveguide are formed of monocrystalline, or single-crystal, material. While one layer of monocrystalline material may be deposited on another monocrystalline material, current deposition methods do not enable monocrystalline materials to be repeatedly deposited, layer-by-layer. For example, each subsequent layer may have a less uniform crystal structure, and after multiple layers have been deposited, the higher layers (e.g., the third or fourth layer) may not have sufficient uniformity to form waveguides and other optical structures.

Embodiments of the present disclosure may improve on at least some of the challenges and issues described above by stacking multiple optical layers to generate a vertically-stacked PIC. Monocrystalline layers are separately fabricated, and layer transfer is used to form a stack that includes multiple monocrystalline layers. For example, a first monocrystalline layer and a second monocrystalline layer are grown on separate substrates. Optical features including waveguides may be formed in or over the first monocrystalline layer. The second monocrystalline layer is attached to a carrier wafer, bonded to the first monocrystalline layer, and the carrier wafer is removed. Optical features including waveguides may then be formed in or over the second monocrystalline layer, providing a second optical layer. A bonding material having a lower crystallinity (e.g., a polycrystalline material), or no crystal structure (e.g., an amorphous material), may bond the first and second monocrystalline layers. In addition, isolation layers are included in the stacked structure to prevent leakage of optical signals from the waveguides. The isolation layers have a different index of refraction from the optical waveguides.

The isolation layers may be formed using deposition or layer transfer. In general, vertically-stacked PICs may have various arrangements of waveguide layers, isolation layers, and bonding layers. In some embodiments, an isolation layer has a monocrystalline structure, over which a second monocrystalline material for forming a waveguide layer is deposited. In other embodiments, an isolation layer has a polycrystalline or amorphous structure, and a waveguide layer is stacked over and bonded to the isolation layer using the layer transfer process. In some embodiments, both isolation layers and waveguide layers are stacked and bonded using layer transfer. Alternatively, either the isolation layer or the waveguide layer are stacked and bonded using layer transfer, and the other of the isolation layer or the waveguide layer is deposited.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well-known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For convenience, if a collection of drawings designated with different letters are present, e.g., FIGS. 6A-6E, such a collection may be referred to herein without the letters, e.g., as "FIG. 6."

In the drawings, some schematic illustrations of example structures of various devices and assemblies described herein may be shown with precise right angles and straight lines, this is simply for ease of illustration, and embodiments of these assemblies may be curved, rounded, or otherwise irregularly shaped as dictated by, and sometimes inevitable due to, the manufacturing processes used to fabricate semiconductor device assemblies. Therefore, it is to be understood that such schematic illustrations may not reflect real-life process limitations which may cause the features to not look so "ideal" when any of the structures described herein are examined using e.g., scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication. Furthermore, although a certain number of a given element may be illustrated in some of the drawings (e.g., a certain number and type of interconnects and waveguides in the first and second IC structures of the IC assemblies illustrated in some drawings, a certain number of dies in the IC packages illustrated in other drawings, etc.), this is simply for ease of illustration, and more, or less, than that number may be included in IC assemblies and related devices according to various embodiments of the present disclosure. Still further, various views shown in some of the drawings are intended to show relative arrangements of various elements therein. In other embodiments, various IC assemblies, or portions thereof, may include other elements or components that are not illustrated. Inspection of layout and mask data and reverse engineering of parts of a device to reconstruct the circuit using e.g., optical microscopy, TEM, or SEM, and/or inspection of a cross-section of a device to detect the shape and the location of various device elements described herein using e.g., physical failure analysis (PFA) would allow determination of presence of one or more IC assemblies having multiple stacked optical layers as described herein.

Various operations may be described as multiple discrete actions or operations in turn, in a manner that is most helpful in understanding the claimed subject matter. However, the order of description should not be construed as to imply that these operations are necessarily order dependent. These operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. Although certain elements may be referred to in the singular herein, such elements may include multiple sub-elements. For example, "an electrically conductive material" may include one or more electrically conductive materials.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

For example, the term "interconnect" may be used to describe any element formed of an electrically conductive material for providing electrical connectivity to one or more components associated with an IC or/and between various such components. In general, the "interconnect" may refer to both conductive traces (also sometimes referred to as "lines" or "trench contacts") and conductive vias. In general, in context of interconnects, the term "conductive trace" may be used to describe an electrically conductive element isolated by an insulator material (e.g., a low-k dielectric material) that is provided within the plane of an IC die. Such traces are typically stacked into several levels, or several layers, of metallization stacks. On the other hand, the term "via" may be used to describe an electrically conductive element that interconnects two or more traces of different levels. To that end, a via may be provided substantially perpendicularly to the plane of an IC die and may interconnect two traces in adjacent levels or two traces in not adjacent levels. A term "metallization stack" may be used to refer to a stack of one or more interconnects for providing connectivity to different circuit components of an IC chip. Sometimes, traces and vias may be referred to as "conductive traces" and "conductive vias", respectively, to highlight the fact that these elements include electrically conductive materials such as metals.

Interconnects as described herein, in particular interconnects IC assemblies having multiple stacked optical layers as described herein, may be used for providing connectivity to one or more components associated with an IC or/and between various such components, where, in various embodiments, components associated with an IC may include, for example, transistors, diodes, power sources, resistors, capacitors, inductors, sensors, transceivers, receivers, antennas, etc. Components associated with an IC may include those that are mounted on IC or those connected to an IC. The IC may be either analog or digital and may be used in a number of applications, such as microprocessors, optoelectronics, logic blocks, audio amplifiers, etc., depending on the components associated with the IC. The IC may be employed as part of a chipset for executing one or more related functions in a computer.

In context of photonics, waveguides described herein may be considered a type of "interconnect" in that they support propagation of optical signals between various components associated with an IC and/or between various such components. Such interconnects may be referred to as "optical interconnects" to differentiate them from electrically conductive interconnects of electronic components, which may be referred to herein simply as "interconnects." Similarly, vias made of dielectric materials to serve as waveguides that support propagation of optical signals are described herein as "dielectric vias" to differentiate them from electrically conductive vias of electronic components, which may be described herein simply as "vias."

In another example, the terms "package" and "IC package" are synonymous, as are the terms "die" and "IC die," the term "insulating" means "electrically insulating," the term "conducting" means "electrically conducting," unless otherwise specified. Furthermore, the term "connected" may be used to describe a direct electrical or magnetic connection between the things that are connected, without any intermediary devices, while the term "coupled" may be used to describe either a direct electrical or magnetic connection between the things that are connected, or an indirect connection through one or more passive or active intermediary devices. The term "circuit" may be used to describe one or more passive and/or active components that are arranged to cooperate with one another to provide a desired function.

In yet another example, if used, the terms "oxide," "carbide," "nitride," etc. refer to compounds containing, respectively, oxygen, carbon, nitrogen, etc., the term "high-k dielectric" refers to a material having a higher dielectric constant than silicon oxide, while the term "low-k dielectric" refers to a material having a lower dielectric constant than silicon oxide.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

Example PIC with Multiple Stacked Optical Layers

In general, IC assemblies with multiple stacked optical layers are described herein with reference to IC assemblies, such as IC assembly 100, having a first optical layer 110 and a second optical layer 120 bonded to one another using a bonding material 130. The optical layers 110 and 120 may be fabricated by different manufacturers, using different materials, or different manufacturing techniques. Various examples of IC assemblies that include the first optical layer 110 and second optical layer 120 will now be described with reference to FIGS. 1-8.

While the first optical layer 110 and second optical layers 120 are described as layers that include waveguides and other optical components, in some embodiments, one or both of the optical layers 110 and 120 may be hybrid assemblies that further include electronic components, such as electrically conductive interconnects, transistors, and resistors. Furthermore, the IC assembly 100 may include one or more electronics layers without optical components. While two optical layers 110 and 120 are depicted in FIGS. 1-5, additional optical layers (or hybrid layers) may be included, e.g., the IC assembly 100 may include three or more optical layers similar to the first optical layer 110 and/or second optical layer 120.

Unless stated otherwise, any features of any embodiments of the IC assemblies described with reference to one of the FIGS. 1-8 may be combined with any features of any embodiments of the microelectronic assemblies described with reference to another one or more of the FIGS. 1-8. In some embodiments, individual ones of the IC assembly 100 disclosed herein may serve as a system-in-package (SiP) in which multiple IC structures 110, 120, or multiple pairs of such IC structures, having different functionality are included. In such embodiments, the IC assembly 100 may be referred to as a SiP.

FIG. 1 illustrates a cross-sectional side view of an IC assembly 100 according to some embodiments of the present disclosure. Many of the elements of the IC assembly 100 of FIG. 1 are included in other ones of the accompanying figures; the discussion of these elements is not repeated when discussing these figures, and any of these elements may take any of the forms disclosed herein.

Implementations of the present disclosure may be formed or carried out on a support structure, not specifically shown in FIG. 1. The support structure may be included in the first optical layer 110 or below the first optical layer 110. The support structure may be, e.g., a substrate, a die, a wafer or a chip. The support structure may, e.g., be the wafer 2000 of FIG. 9A, discussed below, and may be, or be included in, a die, e.g., the singulated die 2002 of FIG. 9B, discussed below. The support structure may be a semiconductor substrate composed of semiconductor material systems including, for example, N-type or P-type materials systems. In one implementation, the semiconductor substrate may be a crystalline substrate formed using a bulk silicon or a silicon-oninsulator (SOI) substructure. In other implementations, the semiconductor substrate may be formed using alternate materials, which may or may not be combined with silicon, that include, but are not limited to, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-V materials (i.e., materials from groups III and V of the periodic system of elements), group II-VI (i.e., materials from groups II and IV of the periodic system of elements), or group IV materials (i.e., materials from group IV of the periodic system of elements). In some embodiments, the substrate may be non-crystalline. In some embodiments, the support structure may be a printed circuit board (PCB) substrate. Although a few examples of materials from which the substrate may be formed are described here, any material that may serve as a foundation upon which an optical device implementing any of the IC assemblies with multiple stacked optical layers as described herein may be built falls within the spirit and scope of the present disclosure.

Generally speaking, each of the optical layers 110 and 120 includes waveguides for transmitting optical signals. Each optical layer may further include one or more other materials forming the boundaries of the waveguide and preventing leakage of optical signals from the waveguides; such materials may be referred to as cladding or isolation materials. Multiple isolation materials may be used along different edges or portions of a waveguide. For example, a waveguide having a rectangular cross-section may be formed over a first isolation layer, so a bottom face of the waveguide is coupled to the first isolation layer. A second isolation material may be deposited over the waveguide, so that the second isolation layer surrounds the sides and top face of the waveguide.

The waveguide material has a uniform crystal structure that allows an optical wave to propagate through the waveguide material with minimal loss. For example, the waveguide material may have grain size of at least 5 nanometers. In some embodiments, the waveguide material has a larger minimum grain size, e.g., a grain size of at least 50 nanometers, or a grain size of at least 100 nanometers. The waveguides may be formed of any suitable single-crystal material, such as sapphire, quartz, silicon, a compound of silicon (e.g., silicon oxide), indium phosphide, germanium or a germanium alloy, gallium, arsenic (e.g., an arsenide III compound, where arsenic III is in combination with another element such as boron, aluminum, gallium, or indium), or any group III-V material (i.e., materials from groups III and V of the periodic system of elements).

The isolation material is a material without optical properties, or with different optical properties from the waveguide. For example, the isolation material may include a polycrystalline or amorphous silicon or silicon compound, such as silicon dioxide or silicon nitride. In some embodiments, the isolation material is a single-crystal material with different optical properties than the waveguide, e.g., a monocrystalline material (e.g., single-crystal silicon, gallium arsenide, or any of the other monocrystalline materials mentioned above) with a higher refractive index than the waveguide. In some embodiments, multiple isolation layers are formed of two or more different isolation materials.

The waveguide material may have a refractive index between 1.3 and 4, and an isolation material abutting at least a portion of the waveguide may have a different refractive index between 1.3 and 4. The waveguide material and isolation material may be selected such that the isolation material has a much higher or much lower refractive index than the waveguide material. In some embodiments, the isolation material and the waveguide material may have a similar or same refractive index. In such embodiments, an interface between the waveguide material and the isolation material may prevent leakage of signals into the isolation material, e.g., if the crystal structures of the waveguide material and the isolation material are different, or if the crystal structure restarts at the interface (e.g., if the isolation material and waveguide material are grown separately).

In some embodiments, one or more of the optical layers 110, 120 may further include photonic components to manipulate the optical signals, such as gain chips, diffraction gratings, combiners, demodulators, etc. The photonics components may include any of the waveguide materials described above. In some embodiments, one or more of the optical layers 110, 120 may include electro-optical components, e.g., an electro-optic modulator such as a Mach-Zehnder modulator or a ring oscillator.

The optical layers 110 and 120 are bonded together by a bonding layer 130. The bonding layer 130 is present in between the faces of the optical layers 110 and 120, e.g., above a front face of the optical layer 110 and below a back face of the optical layer 120. For each optical layer 110 and 120, the terms "bottom face" or "back face" of the structure may refer to the back of the structure, e.g., the face of the optical layer 120 along the bonding layer 130 is its bottom face, while the terms "top face" or "front face" of the structure may refer to the opposing upper face. The bonding material 130 may be applied to the one or both faces of the optical layers 110 and 120 that should be bonded and then the optical layers 110 and 120 are put together, possibly while applying a suitable pressure and heating up the assembly to a suitable temperature (e.g., to moderately high temperatures, e.g., between about 50 and 200 degrees Celsius) for a duration of time. An example illustration of a layer transfer process that can be used to bond the second optical layer 120 to the first optical layer 110 is shown in FIG. 6.

In some embodiments, the bonding material 130 may be an adhesive material that ensures attachment of the optical layers 110 and 120 to one another. In some embodiments, the bonding material 130 may be an etch-stop material. In some embodiments, the bonding material may be both an etch-stop material and have suitable adhesive properties to ensure attachment of optical layers 110 and 120 to one another. Such a bonding interface may be recognizable as a seam or a thin layer in the IC assembly 100, using, e.g., selective area diffraction (SED). The bonding material 130 has a lower crystallinity than one or more materials in each of the optical layers 110 and 120. In particular, the bonding material 130 has a lower crystallinity than the waveguides in the optical layers 110 and 120. For example, the bonding material 130 may have polycrystalline structure with a grain size of 20 nm or lower, e.g., a grain size between 1 nm and 20 nm. In some embodiments, the bonding material 130 has a grain size of 10 nm or lower, e.g., between 5 nm and 10 nm. In some embodiments, the bonding material 130 may have an amorphous structure. A polycrystalline or amorphous bonding material 130 is used to prevent optical leakage or transmission of optical signals along the bonding material 130. In some embodiments, the bonding material 130 is used as an isolation material, described above.

In some embodiments, the bonding material 130 may include silicon, nitrogen, and carbon, where the atomic percentage of any of these materials may be at least 1%, e.g., between about 1% and 50%, indicating that these elements are added deliberately, as opposed to being accidental impurities which are typically in concentration below about 0.1%. Using an etch-stop material that includes include silicon, nitrogen, and carbon, where the atomic percentage of any of these materials may be at least 1%, e.g., SiOCN, may be advantageous in terms that such a material may act both as an etch-stop material, and have sufficient adhesive properties to bond the first and second optical layers 110, 120 together. In addition, an etch-stop material at the interface between the first and second optical layers 110, 120 that includes include silicon, nitrogen, and carbon, where the atomic percentage of any of these materials may be at least 1%, may be advantageous in terms of improving etch-selectivity of this material with respect to etch-stop materials that may be used in different of the first and second optical layers 110, 120.

In some embodiments, no bonding material 130 may be used, in which case the layer labeled "130" in FIG. 1 represents a bonding interface resulting from the bonding of the optical layers 110 and 120 to one another. Such a bonding interface may be recognizable as a seam or a thin layer in the IC assembly 100, using, e.g., SED; the bonding interface would still be noticeable as a seam or a thin layer in what otherwise appears as an isolation layer or joined pair of isolation layers. As used herein, unless specified otherwise, references to the "bonding material 130" are applicable to a "bonding interface" for the embodiments where no deliberately added adhesive material is used to bond the optical layers 110 and 120.

In some embodiments, the IC assembly 100 may include one or more dielectric vias, providing one or more dielectric pathways for guiding optical signals between the optical layers 110 and 120. The dielectric vias extend through the bonding material 130. An example dielectric via is shown in FIG. 10B.

Example Arrangements of Optical Layers

The waveguide layers and isolation layers may be stacked in various configurations to create a PIC with multiple stacked optical layers. In general, when producing a stacked PIC, each layer (e.g., a waveguide layer or an isolation layer) may either be deposited onto the layer below (e.g., a waveguide layer deposited on an isolation layer), or fabricated separately and transferred onto the layer below using a layer transfer process. As noted above, the waveguide material is monocrystalline. The isolation material may be monocrystalline, or it may have a different structure, e.g., polycrystalline or amorphous. A single-crystal structure (e.g., a monocrystalline waveguide layer) may be deposited over another monocrystalline layer (e.g., a monocrystalline isolation layer). However, repeated deposition of monocrystalline layers typically results in defects in the higher layers. For example, a monocrystalline waveguide layer (e.g., single-crystal germanium) can be deposited over a monocrystalline base layer (e.g., a single-crystal silicon substrate). The waveguide layer may have some defects (e.g., grain boundaries), but the crystal size is sufficiently large to form waveguides that propagate optical signals with minimal losses. When light propagating through a waveguide passes through a grain boundary, the light diffracts and loses energy, which is undesirable. If subsequent single-crystal layers are deposited over the waveguide layer (e.g., a second silicon isolation layer, followed by a second germanium waveguide layer), these layers can have decreasing crystal sizes and more grain boundaries, which make them unsuitable for waveguides. Therefore, to create a stacked PIC with sufficiently monocrystalline waveguide layers, at least some of the layers (isolation and/or waveguide layers) are stacked using a layer transfer process.

Figure 2:
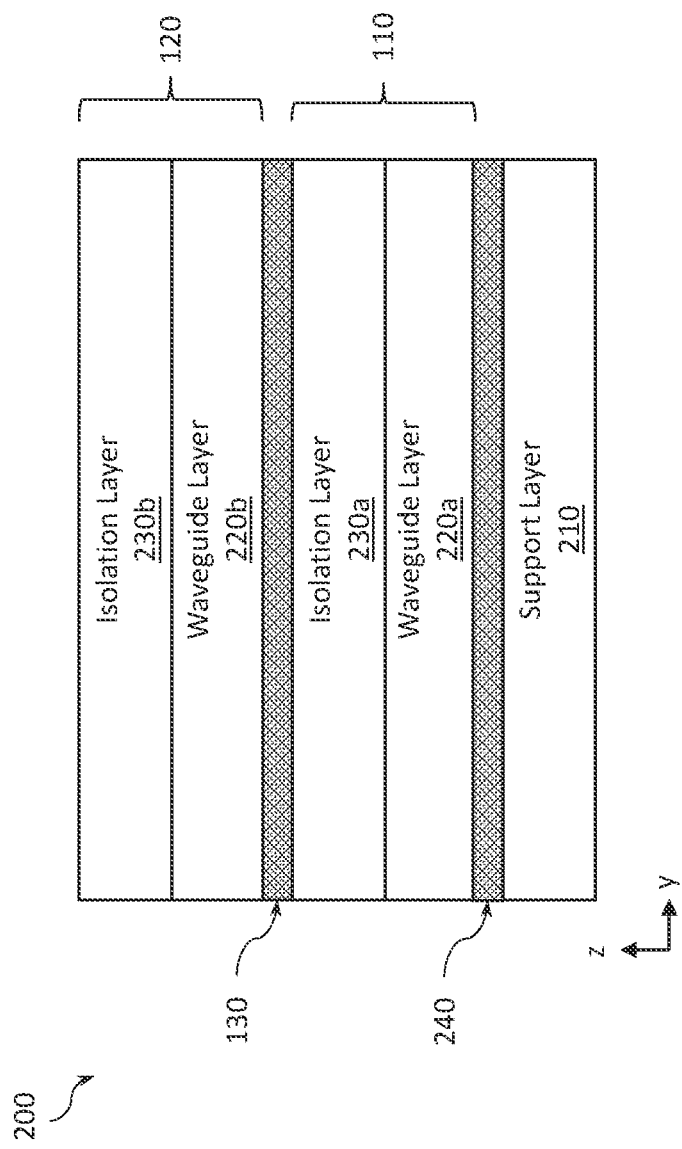
FIG. 2 provides a schematic illustration of a first embodiment of an IC assembly with multiple optical layers.

FIG. 2 provides a schematic illustration of a first embodiment of an IC assembly 200 with multiple optical layers. In this example, a support layer 210 forms the base of the IC assembly 200. The support layer 210 may be, e.g., a substrate, a die, a wafer, or a chip. The support layer 210 may be the wafer 2000 of FIG. 9A, discussed below, and may be, or be included in, a die, e.g., the singulated die 2002 of FIG. 9B, discussed below. The support layer 210 may be formed of any material, such as the support structure materials described with respect to FIG. 1.

The first optical layer 110 is formed over the support layer 210. The first optical layer 110 includes a waveguide layer 220a and an isolation layer 230a. The second optical layer 120 is formed over the first optical layer 110, and the second optical layer 120 is bonded to the first optical layer 110 by the bonding material 130. The second optical layer 120 includes a waveguide layer 220b and an isolation layer 230b. In this example, the waveguide layers 220a and 220b of the first and second optical layers 110 and 120 are similar, e.g., formed of the same material and using a similar process. The waveguide layers 220a and 220b are referred to generally as waveguide layers 220. In other examples, the waveguide layers 220a and 220b may be different, e.g., formed of different materials. In this example, the isolation layers 230a and 230b of the first and second optical layers 110 and 120 are similar, e.g., formed of the same material and using a similar process. The isolation layers 230a and 230b are referred to generally as isolation layers 230. In other examples, the isolation layers 230a and 230b may be different, e.g., formed of different materials. While two optical layers 110 and 120 are shown in FIG. 2, in other embodiments, one or more additional optical layers may be formed over the second optical layer 120, each including a waveguide layer 220 and an isolation layer 230.

A bonding layer 240 bonds the first optical layer 110, and in particular, the waveguide layer 220a, to the support layer 210. The bonding layer 240 may be similar to the bonding layer 130, described with respect to FIG. 1. The waveguide layer 220a is transferred onto the support layer 210 using a layer transfer process, such as the process shown in FIG. 6. The bonding material 240 may be applied to the back face of the waveguide layer 220a, to the front face of the support layer 210, or to both. The waveguide layer 220b is also transferred onto the first optical layer 110, and in particular, over the isolation layer 230a, using the layer transfer process. The bonding material 130 may be applied to the back face of the waveguide layer 220b, to the front face of the isolation layer 230a, or to both.

The waveguide layers 220a and 220b are fabricated separately from the IC assembly 200 and transferred onto the IC assembly 200, i.e., over the support layer 210 and isolation layer 230a, respectively. For example, each waveguide layer 220 is formed from an upper portion of a single-crystal silicon wafer or die, or each waveguide layer 220 is a single-crystal layer formed over a separate single-crystal substrate. Fabricating the waveguide layers 220 separately ensures that the waveguide layers 220 have a monocrystalline structure with minimal grain boundaries. The waveguide layers 220 are transferred as sheets of monocrystalline material. After each waveguide layer 220 is transferred, the waveguide layer 220 is patterned and etched to form various optical structures, such as waveguides and other optical features.

After the optical structures have been formed in a given waveguide layer 220, an isolation layer 230 is formed over the waveguide layer 220 using deposition (e.g., the isolation layer 230a is deposited over the waveguide layer 220a). The isolation layers 230 may be made of any material, including non-optical monocrystalline material, polycrystalline material, or amorphous material. While a single isolation layer 230 is shown in each optical layer 110 and 120, in some embodiments, the isolation layers 230 are formed from multiple layers. For example, the isolation layer 230a may include a first material that encloses the waveguide features, and a second material that is layered over the first material. A front face of the first isolation layer 230a may be smoothed (e.g., by grinding and polishing) to provide a suitable surface for layer transferring the second waveguide layer 220b.

FIG. 2 depicts the first optical layer 110 as including the waveguide layer 220a and isolation layer 230a, and the second optical layer 120 as including the waveguide layer 220b and the isolation layer 230b. While each optical layer 110 and 120 includes one waveguide layer 220, the isolation layers 230 and bonding layers 130 and 240 may be considered parts of different optical layers from the depiction in FIG. 2. For example, the support layer 210 may be considered part of the first optical layer 110. As another example, the isolation layer 230a may be considered part of the second optical layer 120, or part of both the first optical layer 110 and the second optical layer 120 (e.g., a back portion of the isolation layer 230a is part of the first optical layer 110, and a front portion of the isolation layer 230a and the bonding material 130 are part of the second optical layer 120).

Figure 3:
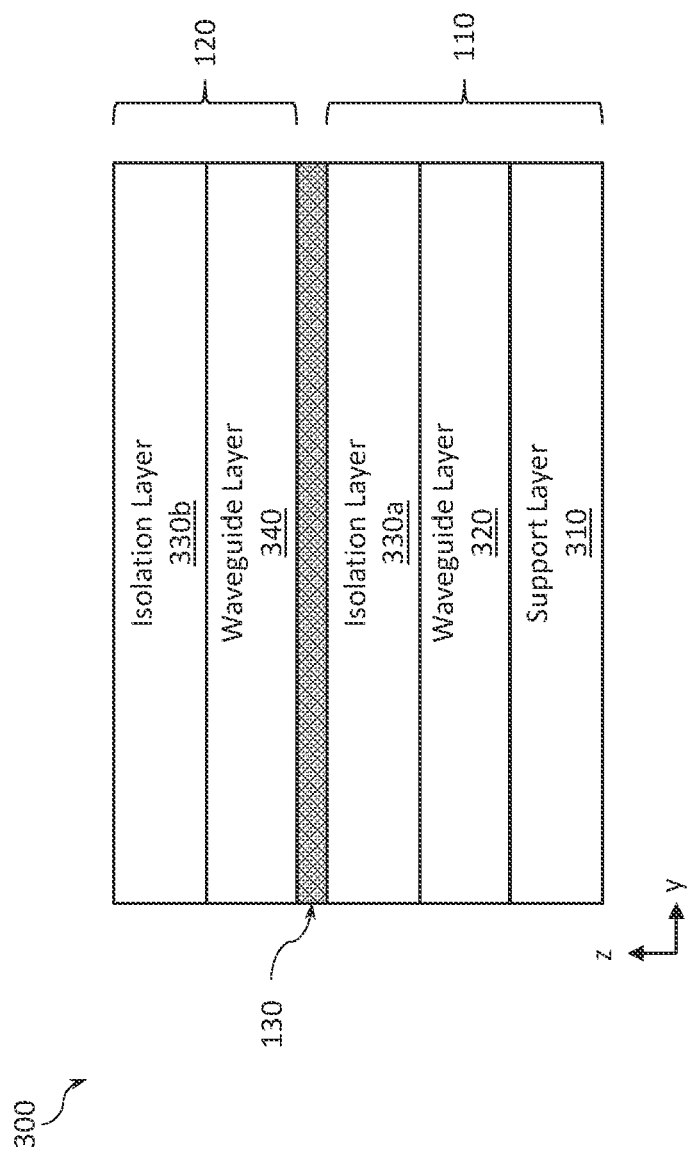
FIG. 3 provides a schematic illustration of a second embodiment of an IC assembly with multiple optical layers.

FIG. 3 provides a schematic illustration of a second embodiment of an IC assembly 300 with multiple optical layers. In this example, a support layer 310 forms the base of the IC assembly 300, and the base of the first optical layer 110. The support layer 310 may be, e.g., a substrate, a die, a wafer, or a chip. The support layer 310 may be the wafer 2000 of FIG. 9A, discussed below, and may be, or be included in, a die, e.g., the singulated die 2002 of FIG. 9B, discussed below. In this example, the support layer 310 is formed of a monocrystalline material, e.g., a single-crystal silicon, or a single-crystal gallium arsenide (GaAs).

A waveguide layer 320 is deposited over the support layer 310. In some embodiments, the support layer 310 and waveguide layer 320 may be a silicon-on-insulator (SOI) wafer, e.g., the waveguide layer 320 is a single-crystal silicon layer formed over a single-crystal insulator, such as sapphire, that acts as the support layer 310. In such embodiments, optical features, including waveguides, are formed from the upper silicon layer of the SOI wafer.

The isolation layer 330a is deposited over the waveguide layer 320; the isolation layer 330a may be similar to the isolation layer 230a described with respect to FIG. 2. The isolation layer 330a may be the same material as the support layer 310 or a different material. The support layer 310, waveguide layer 320, and isolation layer 330a jointly form the optical layer 110. A waveguide layer 340 is layer transferred over the first optical layer 110. In particular, the back face of the waveguide layer 340 is bonded to the isolation layer 330a by the bonding layer 130. A second isolation layer 330b is deposited over the waveguide layer 340. The waveguide layer 340 and isolation layer 330b may be similar to the waveguide layer 220b and isolation layer 230b described with respect to FIG. 2. Additional optical layers similar to the second optical layer 120 may be formed over the second optical layer 120 in a similar manner to the second optical layer 120.

As noted with respect to FIG. 2, each optical layer 110 and 120 includes one waveguide layer 320 or 340, but the isolation layers 330 and bonding layer 130 may be considered parts of different optical layers from the depiction in FIG. 2. For example, the support layer 310 may not be considered part of the first optical layer 110. As another example, the isolation layer 330a may be considered part of the second optical layer 120, or part of both the first optical layer 110 and the second optical layer 120 (e.g., a back portion of the isolation layer 330a is part of the first optical layer 110, and a front portion of the isolation layer 330a and the bonding material 130 are part of the second optical layer 120).

Figure 4:
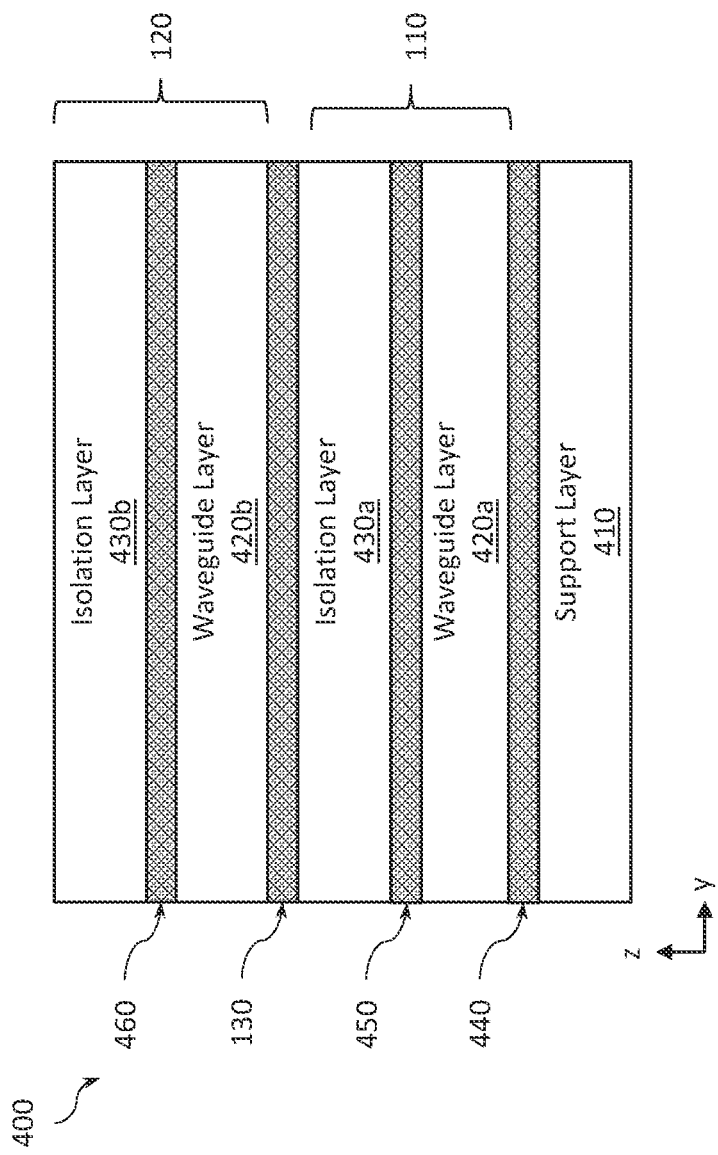
FIG. 4 provides a schematic illustration of a third embodiment of an IC assembly with multiple optical layers.

FIG. 4 provides a schematic illustration of a third embodiment of an IC assembly 400 with multiple optical layers. In this example, each of the waveguide layers and isolation layers are layer transferred onto the IC assembly 400 and separated by a bonding layer. In this example, a support layer 410 forms the base of the IC assembly 400. The support layer 410 may be, e.g., a substrate, a die, a wafer, or a chip. The support layer 410 may be the wafer 2000 of FIG. 9A, discussed below, and may be, or be included in, a die, e.g., the singulated die 2002 of FIG. 9B, discussed below. The support layer 410 may be formed of any material, such as the support structure materials described with respect to FIG. 1.

The first optical layer 110 is formed over the support layer 410. The first optical layer 110 includes a waveguide layer 420a, an isolation layer 430a, and a bonding layer 450 bonding the isolation layer 430a to the waveguide layer 420a. A bonding layer 440 bonds the first optical layer 110 to the support layer 410, and in particular, bonds a back face of the waveguide layer 420a to a front face of the support layer 410. The bonding layer 440 may be similar to the bonding layer 130 described with respect to FIG. 1.

The second optical layer 120 is formed over the first optical layer 110, and the second optical layer 120 is bonded to the first optical layer 110 by the bonding material 130. The second optical layer 120 includes a waveguide layer 420b, an isolation layer 430b, and a bonding layer 460 bonding the isolation layer 430a to the waveguide layer 420a.

The waveguide layers 420a and 420b, isolation layers 430a and 430b, and bonding layers 450 and 460 between the waveguide layers 420 and isolation layers 430 are similar. The waveguide layers 420a and 420b are referred to generally as waveguide layers 420, and the isolation layers 430a and 430b are referred to generally as isolation layers 430. In other examples, the waveguide layers 420a and 420b may be different, e.g., formed of different materials; the isolation layers 230a and 230b may be different, e.g., formed of different materials; and/or the bonding layers 450 and 460 may be different, e.g., formed of different materials. While two optical layers 110 and 120 are shown in FIG. 4, in other embodiments, one or more additional optical layers may be formed over the second optical layer 120, each including a waveguide layer 420 and an isolation layer 430 bonded to the waveguide layer 420.

The waveguide layer 420a is transferred onto the support layer 410 using a layer transfer process, such as the process shown in FIG. 6. The bonding material 440 may be applied to the back face of the waveguide layer 420a, to the front face of the support layer 410, or to both. Each subsequent layer, e.g., the isolation layer 430a, the waveguide layer 420b, and the isolation layer 430b, are transferred onto the layer below using a layer transfer process. For each transfer, the bonding material (e.g., bonding material 450, 130, and 460) may be applied to the back face of the layer being added, to the front face of the top-most layer, or to both.

The waveguide layers 420a and 420b and the isolation layers 430a and 430b are fabricated separately from the IC assembly 400 and transferred onto the IC assembly 400. As described with respect to FIGS. 1 and 2, each waveguide layer 420 is a monocrystalline material with minimal grain boundaries, and the waveguide layers 420 are each transferred as a sheet of monocrystalline material. After each waveguide layer 420 is transferred, the waveguide layer 420 is patterned and etched to form various optical structures, such as waveguides and other optical features.

After the optical structures have been formed in a given waveguide layer 420, an isolation layer 430 is bonded and attached to the waveguide layer 420 below. The isolation layers 430 may be made of any material, including non-optical monocrystalline material, polycrystalline material, or amorphous material. While a single isolation layer 430 is shown in each optical layer 110 and 120, in some embodiments, the isolation layers 430 are formed from multiple layers. For example, a first isolation layer may be deposited over the waveguide layer 420 to enclose the optical features, and a second isolation layer is layer transferred over the first isolation layer. The first and second isolation layers may be the same material or different materials, e.g., the first isolation layer is an amorphous material, and the second isolation layer is a single-crystal material.

FIG. 4 depicts the first optical layer 110 as including the waveguide layer 420a and isolation layer 430a, and the second optical layer 120 as including the waveguide layer 420b and the isolation layer 430b. While each optical layer 110 and 120 includes one waveguide layer 420, the isolation layers 430 and various bonding layers may be considered parts of different optical layers from the depiction in FIG. 4. For example, the support layer 410 may be considered part of the first optical layer 110. As another example, the isolation layer 430a may be considered part of the second optical layer 120, or part of both the first optical layer 110 and the second optical layer 120 (e.g., a back portion of the isolation layer 430a is part of the first optical layer 110, and a front portion of the isolation layer 430a and the bonding material 130 are part of the second optical layer 120).

Figure 5:
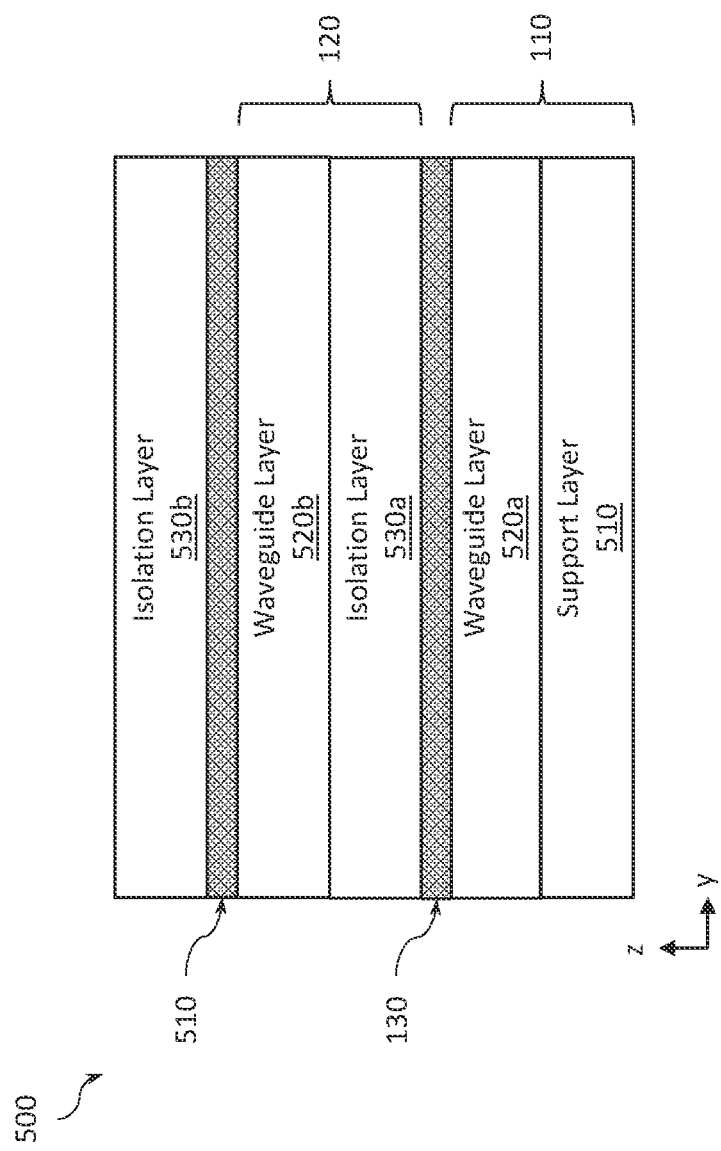
FIG. 5 provides a schematic illustration of a fourth embodiment of an IC assembly with multiple optical layers.

FIG. 5 provides a schematic illustration of a fourth embodiment of an IC assembly 500 with multiple optical layers. In this example, isolation layers are layer transferred onto the IC assembly 500 and separated from the waveguide layers below by a bonding layer, and the waveguide layers are deposited over the isolation layers. The isolation layers are formed of a monocrystalline material so that the waveguide layers, deposited over the isolation layers, have a single-crystal structure with sufficient uniformity to create optical features.

In this example, a support layer 510 forms the base of the IC assembly 500, and the base of the first optical layer 110. The support layer 510 may be, e.g., a substrate, a die, a wafer, or a chip. The support layer 510 may be the wafer 2000 of FIG. 9A, discussed below, and may be, or be included in, a die, e.g., the singulated die 2002 of FIG. 9B, discussed below. In this example, the support layer 310 is formed of a monocrystalline material, e.g., a single-crystal silicon, or a single-crystal gallium arsenide (GaAs).

A waveguide layer 520a is deposited over the support layer 510. In some embodiments, the support layer 510 and waveguide layer 520a may be a silicon-on-insulator (SOI) wafer, e.g., the waveguide layer 520 is a single-crystal silicon layer formed over a single-crystal insulator, such as sapphire, that acts as the support layer 510. In such embodiments, optical features, including waveguides, are formed from the upper silicon layer of the SOI wafer. The support layer 510 and waveguide layer 520a form the optical layer 110. After the waveguide layer 520a, and each subsequent waveguide layer 520, is deposited, the waveguide layer 520 is patterned and etched to form various optical structures, such as waveguides and other optical features.

An isolation layer 530a is formed over the waveguide layer 520a using a layer transfer process. The isolation layer 530a is a monocrystalline material that with different optical properties from the waveguide layer 520a. For example, if the waveguide layer 520a is InGaAs, the isolation layer 530a may be GaAs; if the waveguide layer 520a is germanium, the isolation layer 530a may be single-crystal silicon. The bonding layer 130 bonds the isolation layer 530a to the waveguide layer 520a. A second waveguide layer 520b is then deposited over the isolation layer 530a. Because the isolation layer 530a is a layer transferred sheet of single-crystal material, a second waveguide layer 520b deposited over the isolation layer 530a has a single-crystal structure with no or minimal grain boundaries, so that optical features can be formed in the second waveguide layer 520b. In this example, an additional isolation layer 530b is bonded to the front face of the waveguide layer 520b. Additional optical layers similar to the second waveguide layer 520b may be formed over the second optical layer 120, e.g., over the isolation layer 530b, in a similar manner.

While a single isolation layer 530a is shown in the second optical layer 120 and a single isolation layer 530b is shown over the second optical layer 120, in some embodiments, the isolation layers 530 are formed from multiple layers. For example, a first isolation layer may be deposited over the waveguide layer 520 to enclose the optical features, and a second isolation layer is layer transferred over the first isolation layer. The first and second isolation layers may be the same material or different materials, e.g., the first isolation layer is an amorphous material, and the second isolation layer is a single-crystal material.

FIG. 5 depicts the first optical layer 110 as including the waveguide layer 520a and support layer 510, and the second optical layer 120 as including the waveguide layer 520b and the isolation layer 530a. While each optical layer 110 and 120 includes one waveguide layer 520, the isolation layers 530 and various bonding layers may be considered parts of different optical layers from the depiction in FIG. 5. For example, the support layer 510 may not be considered part of the first optical layer 110. As another example, the isolation layer 530a may be considered part of the first optical layer 110, or part of both the first optical layer 110 and the second optical layer 120 (e.g., a back portion of the isolation layer 530a and the bonding material 130 are part of the first optical layer 110, and a front portion of the isolation layer 530a is part of the second optical layer 120).

Example Layer Transfer Process

FIG. 6A-6E illustrate an example layer transfer process for forming an IC assembly with multiple stacked optical layers. The illustrated layer transfer process may be used to fabricate any of the IC assemblies shown in FIGS. 1-5.

FIG. 6A illustrates a monocrystalline material 610, e.g., a monocrystalline material for forming a waveguide layer, such as the waveguide layers 220, 340, or 420. Alternatively, the monocrystalline material 610 may be used to form an isolation layer, e.g., an isolation layer 530 over which a single-crystal waveguide layer is deposited. While layer transfer of a monocrystalline material is depicted in FIG. 6, a similar process may be used to layer transfer a polycrystalline or amorphous material, e.g., for an isolation layer 430 in FIG. 4.

The monocrystalline material 610 is formed as a sheet that extends in an x-direction (into and/or out of the page) and in the y-direction, labelled in FIG. 6. The monocrystalline material 610 may have a height in the z-direction of up to 1 millimeter. While the monocrystalline material 610 is depicted as a single material having a single crystal structure, in some embodiments, the monocrystalline material 610 includes multiple layers of monocrystalline materials, e.g., a single-crystal silicon layer formed over a single-crystal sapphire layer. In such embodiments, the lower layer may be an isolation layer, such that an isolation layer and a waveguide layer are transferred onto an IC assembly in a single layer transfer process.

In FIG. 6B, a material 620 is implanted into a region 630 of the monocrystalline material 610. The implant material 620 weakens the implant region 630, e.g., by forming cracks in the implant region 630 of the monocrystalline material 610. The implant region 630 is formed as a layer between a lower portion 610a and an upper portion 610b of the monocrystalline material 610. The implant region 630 may be, e.g., between 50 nm and 500 nm from a front face of the monocrystalline material 610. The implant material 620 is electrically inert and does not change the electrical properties of the monocrystalline material 610, e.g., the implant material 620 does not dope the monocrystalline material 610. The implant material 620 may be, for example, hydrogen, helium, nitrogen, or ammonium. In some embodiments, multiple implant materials 620 may be used. After the implant material 620 is implanted into the monocrystalline material 610, the monocrystalline material 610 may cured by applying heat for a period of time. The monocrystalline material 610 outside the region 630 (i.e., the upper portion 610b and lower portion 610a of the monocrystalline material) is not affected by the implant material 620, e.g., these portions 610a and 610b maintain the monocrystalline structure without cracks or other defects (or a minimal amount of defects).

In FIG. 6C, a carrier wafer 640 is bonded to the front face of the monocrystalline material 610, i.e., to the upper portion 610b of the monocrystalline material 610. A bonding material, not shown in FIG. 6, may be used to adhere the carrier wafer 640 to the monocrystalline material 610. In other embodiments, the monocrystalline material 610 is flipped, and the back face of the lower portion 610a is bonded to a carrier wafer 640.

In FIG. 6D, the back face of the monocrystalline material 610 (e.g., the base of the lower portion 610a) is bonded to an IC assembly 650 with a bonding material 660. The bonding material 660 may be, for example, the bonding material 240 or 130 shown in FIG. 2; the bonding material 130 shown in FIG. 3; any of the bonding materials 440, 450, 130, or 460 shown in FIG. 4; or the bonding material 130 or 510 shown in FIG. 5. The IC assembly 650 may be a lower portion (below the layer being transferred) of any of the IC assemblies 200, 300, 400, or 500. To bond the monocrystalline material 610 to the IC assembly 650 with the bonding material 660, a suitable pressure may be applied, or the assembly may be heated up to a suitable temperature (e.g., to moderately high temperatures, e.g., between about 50 and 200 degrees Celsius) for a duration of time.

In FIG. 6E, the carrier wafer 640 and the upper portion 610b of the monocrystalline material are lifted off the IC assembly 650, leaving the lower portion 610a attached to the IC assembly 650. The lower portion 610a attached to the IC assembly 650 may be, e.g., between 10 nm and 500 nm. The cracks formed in the implant region 630 cause the monocrystalline material 610 to break between the upper portion 610b and the lower portion 610a. In some embodiments, after the carrier wafer 640 and upper portion 610b of the monocrystalline material are removed, the exposed front surface of the lower portion 9610a is grinded and/or polished to reduce the height of the lower portion 610a and/or to produce a smooth surface for forming the optical structures.

In alternate embodiments, e.g., if the monocrystalline material 610 is suitably thick and mechanically stable, the carrier wafer 640 is not used. Instead, the monocrystalline material 610 may be flipped to bond the back face of the lower portion 610b to the IC assembly 650, and the upper portion 610a is lifted off the IC assembly 650.

Example Optical Layers

Figure 7:
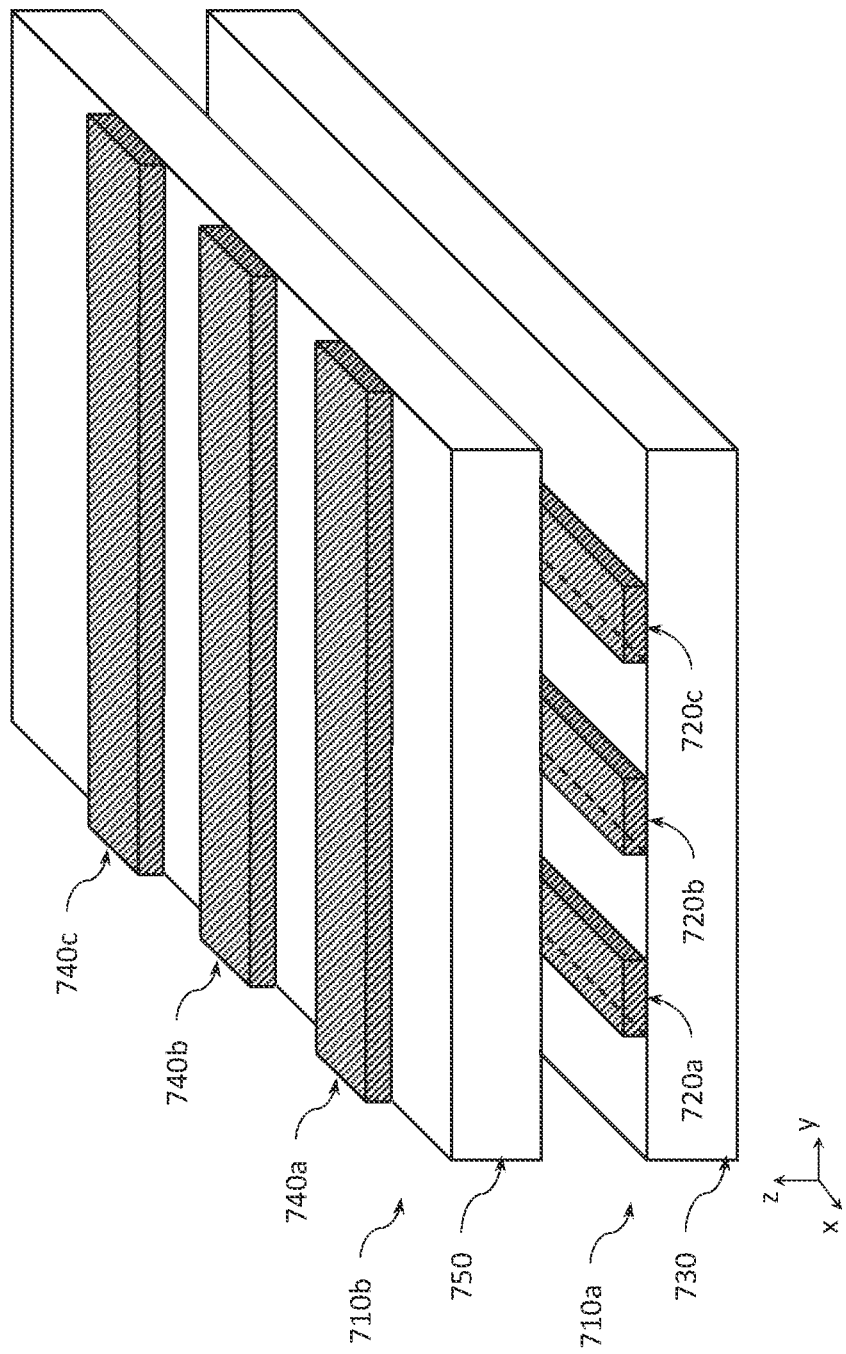
FIG. 7 illustrates two example stacked optical layers according to some embodiments of the present disclosure.

FIG. 7 illustrates two example stacked optical layers according to some embodiments of the present disclosure. One advantage to stacking multiple optical layers, rather than producing a PIC with only a single optical layer, is that the waveguides in different optical layers can be arranged in different directions. FIG. 7 shows two stacked optical layers 710a and 710b. The lower stacked optical layer 710a includes a set of three waveguides 720a, 720b, and 720c (referred to jointly as waveguides 720) formed over a support and/or isolation layer 730. The upper optical layer 710b includes a set of three waveguides 740a, 740b, and 740c (referred to jointly as waveguides 740) formed over an isolation layer 750. For convenience, bonding layers are not shown, and additional isolation layers may also be present. For example, while the second optical layer 710b appears to be separated from the first optical layer 710a, this is to show the orientation of the waveguides 720, and the first optical layer 710a and second optical layer 710b would be bonded together (e.g., by a bonding material) without a gap between them.

The waveguides 720 and the waveguides 740 extend in different directions, e.g., the waveguides 720 extend in the x-direction in the orientation of FIG. 7, and the waveguides 740 extend in the y-direction in the orientation of FIG. 7. While the waveguides 720 and 740 are depicted as extending in orthogonal directions, in other examples, waveguides in different optical layers may extend in any direction relative to each other, e.g., in parallel directions, at a 45°, etc. Forming the optical structures in different optical layers with different orientations provides flexibility for PIC designers in communicating signals on and off the PIC (e.g., different layers can receive and/or transmit signals from different sides of the PIC, which can increase bandwidth on and off the PIC). Different orientations of the optical structures in different layers also provides flexibility for inter-layer optical communication, e.g., using optical vias such as those shown in FIG. 8.

Figure 8A:
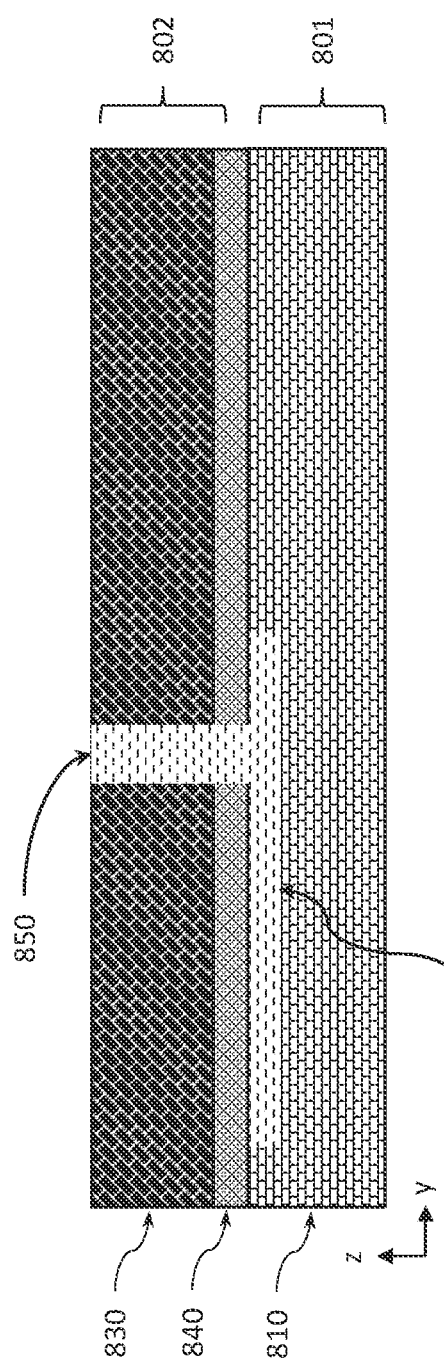
FIGS. 8A and 8B provide example cross-sectional views of PICs, according to some embodiments of the present disclosure.
Figure 8B:
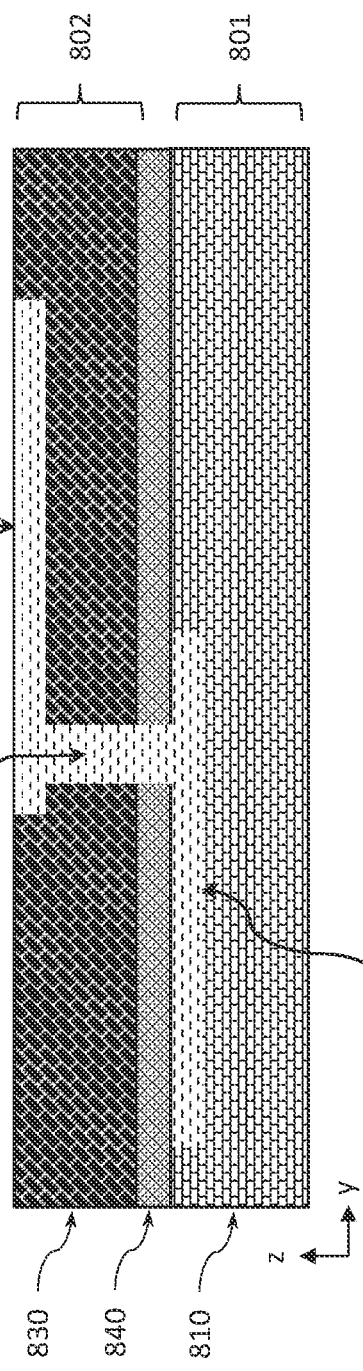

FIGS. 8A and 8B provide example cross-sectional views of PICs, according to some embodiments of the present disclosure. FIG. 8A depicts a PIC with two optical layers, 801 and 802. The lower optical layer 801 includes a first isolation material 810 and a waveguide 820. In this example, the waveguide 820 is formed near a front side of the first isolation material 810; as described with respect to FIGS. 2-5, the lower optical layer 801 may have various configurations, with additional isolation materials and the waveguide 820 in different positions relative to the isolation materials and/or a support structure. The upper optical layer 802 includes a second isolation material 830. In this example, the upper optical layer 802 (and in particular, the isolation material 830) is bonded to the lower optical layer 801 (here, the front side of the waveguide 820 and the front side of the first isolation material 810) by a bonding material 840, which may be similar to the bonding materials described above. An optical via 850 extends vertically (i.e., in the z-direction in the coordinate system shown) through the second isolation material 830. Optical via 850 transmits optical signals to and/or from the waveguide 820 in the lower optical layer 801, enabling transfer of optical signals to between optical layers. For example, the optical via 850 may be coupled to a third optical layer (not shown in FIG. 8A) above the second optical layer 802, or the optical via 850 may be coupled to a separate device for communication of signals on and/or off the PIC.

In this example, the waveguide 820 and optical via 850 are depicted with a same shading, indicating that they are formed from the same material, e.g., any of the waveguide materials discussed above. In other embodiments, the optical via 850 may be formed from a different material from the waveguide 820. Furthermore, in this example, the first isolation material 810, waveguide 820, second isolation material 830, and bonding material 840 and are depicted with different shadings, indicating that they are different materials. In an alternate embodiment, the isolation materials 810 and 830 may be the same. The shadings of the first and second isolation materials 810 and 830 suggest that they are single-crystal materials; in other embodiments, one or both of the isolation materials 830 may be a polycrystalline or amorphous material.

FIG. 8B depicts the PIC with two optical layers, 801 and 802, but unlike FIG. 8A, a waveguide 860 extending along the y-direction is included in the upper optical layer 802. In this example, the optical via 850 connects the waveguide 820 in the lower optical layer 801 to the waveguide 860 in the upper optical layer 802, so that optical signals may be transmitted between the waveguide 820 and the waveguide 860.

Variations and Implementations

Various device assemblies illustrated in FIGS. 1-8 do not represent an exhaustive set of IC devices with multiple stacked optical layers as described herein, but merely provide examples of such devices/structures/assemblies. In particular, the number and positions of various elements shown in FIGS. 1-8 is purely illustrative and, in various other embodiments, other numbers of these elements, provided in other locations relative to one another may be used in accordance with the general architecture considerations described herein.

Further, FIGS. 1-8 are intended to show relative arrangements of the elements therein, and the device assemblies of these figures may include other elements that are not specifically illustrated (e.g., various interfacial layers). Similarly, although particular arrangements of materials are discussed with reference to FIGS. 1-8, intermediate materials may be included in the IC devices and assemblies of these figures. Still further, although some elements of the various cross-sectional views are illustrated in FIGS. 1-8 as being planar rectangles or formed of rectangular solids, this is simply for ease of illustration, and embodiments of these assemblies may be curved, rounded, or otherwise irregularly shaped as dictated by, and sometimes inevitable due to, the manufacturing processes used to fabricate semiconductor device assemblies.

Inspection of layout and mask data and reverse engineering of parts of a device to reconstruct the circuit using e.g., optical microscopy, TEM, or SEM, and/or inspection of a cross-section of a device to detect the shape and the location of various device elements described herein using e.g., Physical Failure Analysis (PFA) would allow determination of presence of the IC devices with multiple stacked optical layers as described herein.

Example Devices

The IC devices with multiple stacked optical layers disclosed herein may be included in any suitable electronic, optical, or hybrid device. FIGS. 9-12 illustrate various examples of apparatuses that may include multiple stacked optical layers disclosed herein.

Figure 9B:
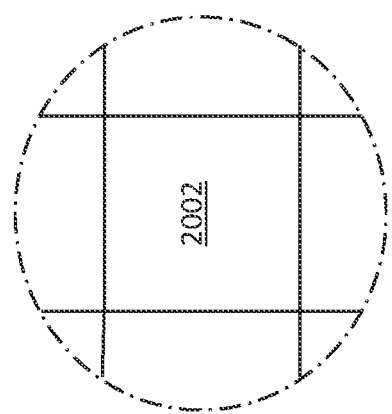
FIGS. 9A and 9B are top views of, respectively, a wafer and dies that may include one or more IC assemblies having multiple stacked optical layers in accordance with any of the embodiments disclosed herein.
Figure 9A:
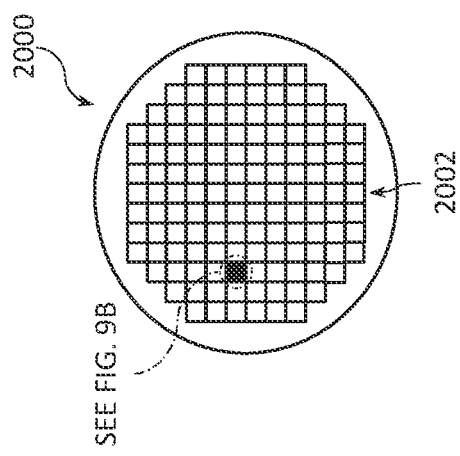

FIGS. 9A and 9B are top views of a wafer and dies that include one or more IC structures with multiple stacked optical layers in accordance with any of the embodiments disclosed herein. The wafer 2000 may be composed of semiconductor material and may include one or more dies 2002 having IC structures formed on a surface of the wafer 2000. Each of the dies 2002 may be a repeating unit of a semiconductor product that includes any suitable IC structure (e.g., the IC structures as shown in any of FIGS. 1-8, or any further embodiments of the IC structures described herein). After the fabrication of the semiconductor product is complete (e.g., after manufacture of one or more IC structures with multiple stacked optical layers as described herein, included in a particular component, e.g., in a logic circuit or in a memory device), the wafer 2000 may undergo a singulation process in which each of the dies 2002 is separated from one another to provide discrete "chips" of the semiconductor product. In particular, devices that include one or more IC structures with multiple stacked optical layers as disclosed herein may take the form of the wafer 2000 (e.g., not singulated) or the form of the die 2002 (e.g., singulated). The die 2002 may include one or more transistors (e.g., one or more of the transistors 1640 of FIG. 10, discussed below) and/or supporting circuitry to route electrical signals to the transistors, as well as any other IC components (e.g., one or more IC structures with multiple stacked optical layers). In some embodiments, the wafer 2000 or the die 2002 may include a memory device (e.g., an SRAM device), a logic device (e.g., an AND, OR, NAND, or NOR gate), or any other suitable circuit element. Multiple ones of these devices may be combined on a single die 2002. For example, a memory array formed by multiple memory devices may be formed on a same die 2002 as a processing device (e.g., the processing device 1802 of FIG. 12) or other logic that is configured to store information in the memory devices or execute instructions stored in the memory array.

Figure 10:
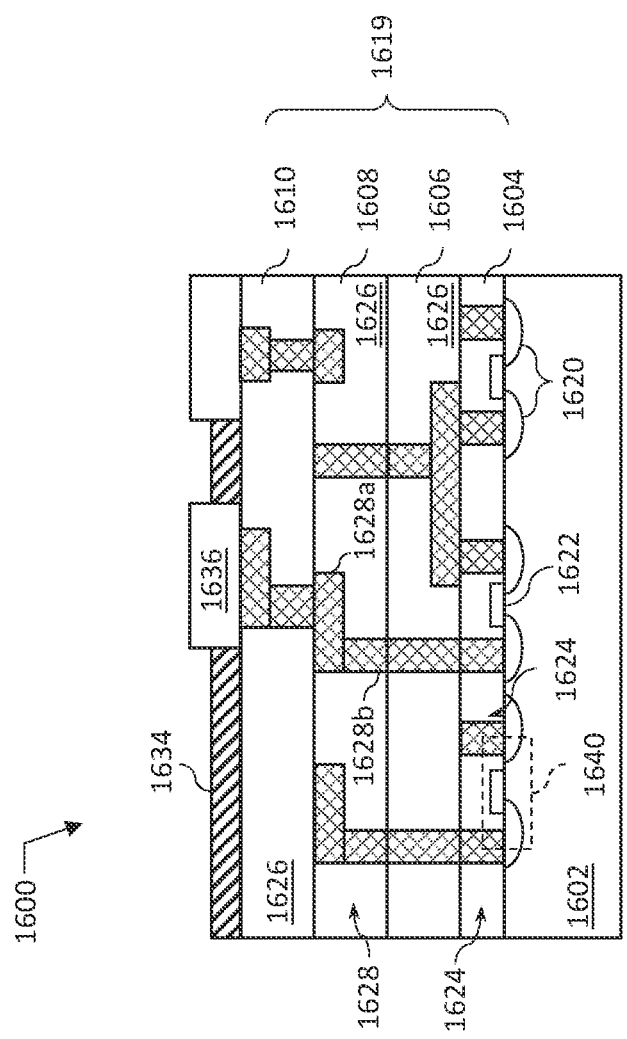
FIG. 10 is a cross-sectional side view of an IC package that may include multiple stacked optical layers in accordance with any of the embodiments disclosed herein.

FIG. 10 is a cross-sectional side view of an IC device 1600 that may include one or more IC structures in accordance with any of the embodiments disclosed herein. The IC device 1600 may be formed on a substrate 1602 (e.g., the wafer 2000 of FIG. 9A) and may be included in a die (e.g., the die 2002 of FIG. 9B). The substrate 1602 may be any substrate as described herein. The substrate 1602 may be part of a singulated die (e.g., the dies 2002 of FIG. 9B) or a wafer (e.g., the wafer 2000 of FIG. 9A).

The IC device 1600 may include one or more device layers 1604 disposed on the substrate 1602. The device layer 1604 may include features of one or more transistors 1640 (e.g., metal oxide semiconductor field-effect transistors (MOSFETs)) formed on the substrate 1602. The device layer 1604 may include, for example, one or more source and/or drain (S/D) regions 1620, a gate 1622 to control current flow in the transistors 1640 between the S/D regions 1620, and one or more S/D contacts 1624 to route electrical signals to/from the S/D regions 1620. The transistors 1640 may include additional features not depicted for the sake of clarity, such as device isolation regions, gate contacts, and the like. The transistors 1640 are not limited to the type and configuration depicted in FIG. 10 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon and nanowire transistors.

Each transistor 1640 may include a gate 1622 formed of at least two layers, a gate electrode layer and a gate dielectric layer.

The gate electrode layer may be formed on the gate interconnect support layer and may consist of at least one P-type workfunction metal or N-type workfunction metal, depending on whether the transistor is to be a PMOS or an NMOS transistor, respectively. In some implementations, the gate electrode layer may consist of a stack of two or more metal layers, where one or more metal layers are workfunction metal layers and at least one metal layer is a fill metal layer. Further metal layers may be included for other purposes, such as a barrier layer or/and an adhesion layer.

For a PMOS transistor, metals that may be used for the gate electrode include, but are not limited to, ruthenium, palladium, platinum, cobalt, nickel, and conductive metal oxides, e.g., ruthenium oxide. A P-type metal layer will enable the formation of a PMOS gate electrode with a workfunction that is between about 4.9 electron Volts (eV) and about 5.2 eV. For an NMOS transistor, metals that may be used for the gate electrode include, but are not limited to, hafnium, zirconium, titanium, tantalum, aluminum, alloys of these metals, and carbides of these metals such as hafnium carbide, zirconium carbide, titanium carbide, tantalum carbide, aluminum carbide, tungsten, tungsten carbide. An N-type metal layer will enable the formation of an NMOS gate electrode with a workfunction that is between about 3.9 eV and about 4.2 eV.

In some embodiments, when viewed as a cross section of the transistor 1640 along the source-channel-drain direction, the gate electrode may be formed as a U-shaped structure that includes a bottom portion substantially parallel to the surface of the substrate and two sidewall portions that are substantially perpendicular to the top surface of the substrate. In other embodiments, at least one of the metal layers that form the gate electrode may simply be a planar layer that is substantially parallel to the top surface of the substrate and does not include sidewall portions substantially perpendicular to the top surface of the substrate. In other embodiments, the gate electrode may be implemented as a combination of U-shaped structures and planar, non-U-shaped structures. For example, the gate electrode may be implemented as one or more U-shaped metal layers formed atop one or more planar, non-U-shaped layers. In some embodiments, the gate electrode may consist of a V-shaped structure (e.g., when a fin of a FinFET transistor does not have a "flat" upper surface, but instead has a rounded peak).

Generally, the gate dielectric layer of a transistor 1640 may include one layer or a stack of layers, and the one or more layers may include silicon oxide, silicon dioxide, and/or a high-k dielectric material. The high-k dielectric material included in the gate dielectric layer of the transistor 1640 may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric layer include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric layer to improve its quality when a high-k material is used.

The S/D regions 1620 may be formed within the substrate 1602 adjacent to the gate 1622 of each transistor 1640, using any suitable processes known in the art. For example, the S/D regions 1620 may be formed using either an implantation/diffusion process or a deposition process. In the former process, dopants such as boron, aluminum, antimony, phosphorous, or arsenic may be ion-implanted into the substrate 1602 to form the S/D regions 1620. An annealing process that activates the dopants and causes them to diffuse farther into the substrate 1602 may follow the ion implantation process. In the latter process, an epitaxial deposition process may provide material that is used to fabricate the S/D regions 1620. In some implementations, the S/D regions 1620 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1620 may be formed using one or more alternate semiconductor materials such as germanium or a group III-V material or alloy. In further embodiments, one or more layers of metal and/or metal alloys may be used to form the S/D regions 1620. In some embodiments, an etch process may be performed before the epitaxial deposition to create recesses in the substrate 1602 in which the material for the S/D regions 1620 is deposited.

Electrical signals, such as power and/or input/output (I/O) signals, may be routed to and/or from the transistors 1640 of the device layer 1604 through one or more interconnect layers disposed on the device layer 1604 (illustrated in FIG. 10 as interconnect layers 1606-1610). For example, electrically conductive features of the device layer 1604 (e.g., the gate 1622 and the S/D contacts 1624) may be electrically coupled with the interconnect structures 1628 of the interconnect layers 1606-1610. The one or more interconnect layers 1606-1610 may form an ILD stack 1619 of the IC device 1600.

The interconnect structures 1628 may be arranged within the interconnect layers 1606-1610 to route electrical signals according to a wide variety of designs (in particular, the arrangement is not limited to the particular configuration of interconnect structures 1628 depicted in FIG. 10). Although a particular number of interconnect layers 1606-1610 is depicted in FIG. 10, embodiments of the present disclosure include IC devices having more or fewer interconnect layers than depicted.

In some embodiments, the interconnect structures 1628 may include trench contact structures 1628*a* (sometimes referred to as "lines") and/or via structures 1628*b* (sometimes referred to as "holes") filled with an electrically conductive material such as a metal. The trench contact structures 1628*a* may be arranged to route electrical signals in a direction of a plane that is substantially parallel with a surface of the substrate 1602 upon which the device layer 1604 is formed. For example, the trench contact structures 1628*a* may route electrical signals in a direction in and out of the page from the perspective of FIG. 10. The via structures 1628*b* may be arranged to route electrical signals in a direction of a plane that is substantially perpendicular to the surface of the substrate 1602 upon which the device layer 1604 is formed. In some embodiments, the via structures

1628b may electrically couple trench contact structures 1628a of different interconnect layers 1606-1610 together.

The interconnect layers 1606-1610 may include a dielectric material 1626 disposed between the interconnect structures 1628, as shown in FIG. 10. The dielectric material 1626 may take the form of any of the embodiments of the dielectric material provided between the interconnects of the IC structures disclosed herein.

In some embodiments, the dielectric material 1626 disposed between the interconnect structures 1628 in different ones of the interconnect layers 1606-1610 may have different compositions. In other embodiments, the composition of the dielectric material 1626 between different interconnect layers 1606-1610 may be the same.

A first interconnect layer 1606 (referred to as Metal 1 or "M1") may be formed directly on the device layer 1604. In some embodiments, the first interconnect layer 1606 may include trench contact structures 1628a and/or via structures 1628b, as shown. The trench contact structures 1628a of the first interconnect layer 1606 may be coupled with contacts (e.g., the S/D contacts 1624) of the device layer 1604.

A second interconnect layer 1608 (referred to as Metal 2 or "M2") may be formed directly on the first interconnect layer 1606. In some embodiments, the second interconnect layer 1608 may include via structures 1628b to couple the trench contact structures 1628a of the second interconnect layer 1608 with the trench contact structures 1628a of the first interconnect layer 1606. Although the trench contact structures 1628a and the via structures 1628b are structurally delineated with a line within each interconnect layer (e.g., within the second interconnect layer 1608) for the sake of clarity, the trench contact structures 1628a and the via structures 1628b may be structurally and/or materially contiguous (e.g., simultaneously filled during a dual-damascene process) in some embodiments.

A third interconnect layer 1610 (referred to as Metal 3 or "M3") (and additional interconnect layers, as desired) may be formed in succession on the second interconnect layer 1608 according to similar techniques and configurations described in connection with the second interconnect layer 1608 or the first interconnect layer 1606.

The IC device 1600 may include a solder resist material 1634 (e.g., polyimide or similar material) and one or more bond pads 1636 formed on the interconnect layers 1606-1610. The bond pads 1636 may be electrically coupled with the interconnect structures 1628 and configured to route the electrical signals of the transistor(s) 1640 to other external devices. For example, solder bonds may be formed on the one or more bond pads 1636 to mechanically and/or electrically couple a chip including the IC device 1600 with another component (e.g., a circuit board). The IC device 1600 may have other alternative configurations to route the electrical signals from the interconnect layers 1606-1610 than depicted in other embodiments. For example, the bond pads 1636 may be replaced by or may further include other analogous features (e.g., posts) that route the electrical signals to external components.

Figure 11:
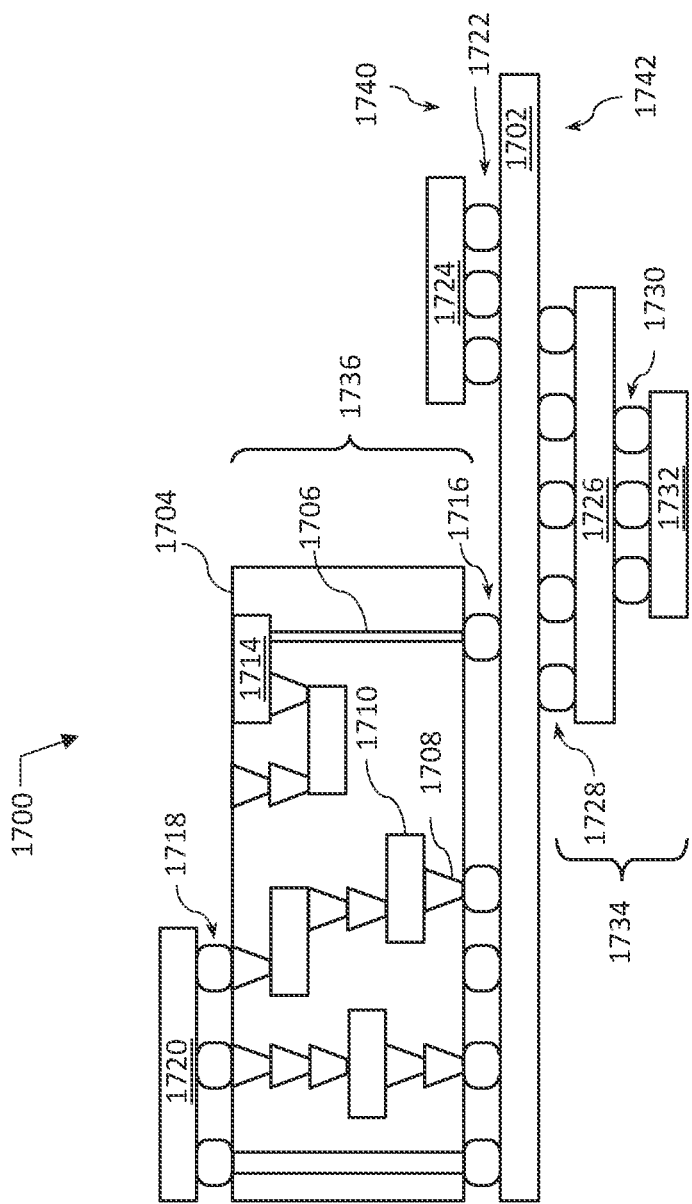
FIG. 11 is a cross-sectional side view of an IC device assembly that may include multiple stacked optical layers in accordance with any of the embodiments disclosed herein.

FIG. 11 is a cross-sectional side view of an IC device assembly 1700 that may include components having or being associated with (e.g., being electrically connected by means of) one or more IC structures with multiple stacked optical layers in accordance with any of the embodiments disclosed herein. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. In particular, any suitable ones of the components of the IC device assembly 1700 may include stacked optical layers, disclosed herein.

In some embodiments, the circuit board 1702 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate.

The IC device assembly 1700 illustrated in FIG. 11 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702 and may include solder balls (as shown in FIG. 11), male and female portions of a socket, an adhesive, an underfill material, and/or any other suitable electrical and/or mechanical coupling structure.

The package-on-interposer structure 1736 may include an IC package 1720 coupled to an interposer 1704 by coupling components 1718. The coupling components 1718 may take any suitable form for the application, such as the forms discussed above with reference to the coupling components 1716. Although a single IC package 1720 is shown in FIG. 11, multiple IC packages may be coupled to the interposer 1704; indeed, additional interposers may be coupled to the interposer 1704. The interposer 1704 may provide an intervening substrate used to bridge the circuit board 1702 and the IC package 1720. The IC package 1720 may be or include, for example, a die (the die 2002 of FIG. 9B), an IC device (e.g., the IC device 1600 of FIG. 10), or any other suitable component. In some embodiments, the IC package 1720 may include multiple stacked optical layers, as described herein. Generally, the interposer 1704 may spread a connection to a wider pitch or reroute a connection to a different connection. For example, the interposer 1704 may couple the IC package 1720 (e.g., a die) to a ball grid array (BGA) of the coupling components 1716 for coupling to the circuit board 1702. In the embodiment illustrated in FIG. 11, the IC package 1720 and the circuit board 1702 are attached to opposing sides of the interposer 1704; in other embodiments, the IC package 1720 and the circuit board 1702 may be attached to a same side of the interposer 1704. In some embodiments, three or more components may be interconnected by way of the interposer 1704.

The interposer 1704 may be formed of an epoxy resin, a fiberglass-reinforced epoxy resin, a ceramic material, or a polymer material such as polyimide. In some implementations, the interposer 1704 may be formed of alternate rigid or flexible materials that may include the same materials described above for use in a semiconductor substrate, such as silicon, germanium, and other group III-V and group IV materials. The interposer 1704 may include metal interconnects 1708 and vias 1710, including but not limited to TSVs 1706. The interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on the interposer 1704. The package-on-interposer structure 1736 may take the form of any of the package-on-interposer structures known in the art.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 11 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

Figure 12:
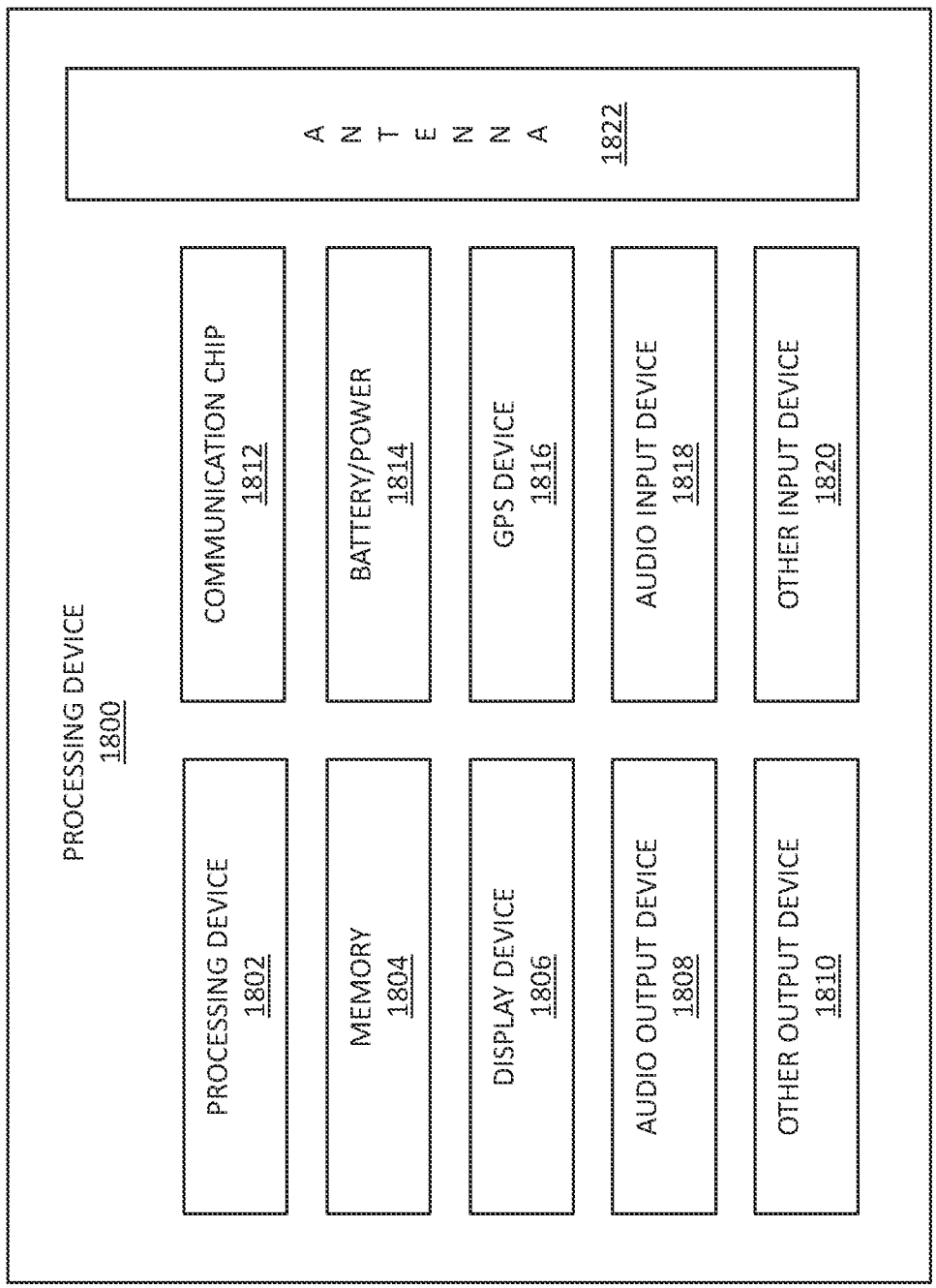
FIG. 12 is a block diagram of an example computing device that may include multiple stacked optical layers in accordance with any of the embodiments disclosed herein.

FIG. 12 is a block diagram of an example computing device 1800 that may include one or more components including one or more IC structures with multiple stacked optical layers in accordance with any of the embodiments disclosed herein. For example, any suitable ones of the components of the computing device 1800 may include a die (e.g., the die 2002 of FIG. 9B) having multiple stacked optical layers as described herein. Any one or more of the components of the computing device 1800 may include, or be included in, an IC device 1600 (FIG. 10). Any one or more of the components of the computing device 1800 may include, or be included in, an IC device assembly 1700 (FIG. 11).

A number of components are illustrated in FIG. 12 as included in the computing device 1800, but any one or more of these components may be omitted or duplicated, as suitable for the application. In some embodiments, some or all of the components included in the computing device 1800 may be attached to one or more motherboards. In some embodiments, some or all of these components are fabricated onto a single system-on-a-chip (SoC) die.

Additionally, in various embodiments, the computing device 1800 may not include one or more of the components illustrated in FIG. 12, but the computing device 1800 may include interface circuitry for coupling to the one or more components. For example, the computing device 1800 may not include a display device 1806, but may include display device interface circuitry (e.g., a connector and driver circuitry) to which a display device 1806 may be coupled. In another set of examples, the computing device 1800 may not include an audio input device 1824 or an audio output device 1808 but may include audio input or output device interface circuitry (e.g., connectors and supporting circuitry) to which an audio input device 1824 or audio output device 1808 may be coupled.

The computing device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the computing device 1800 may include a communication chip 1812 (e.g., one or more communication chips). For example, the communication chip 1812 may be configured for managing wireless communications for the transfer of data to and from the computing device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The computing device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The computing device 1800 may include battery/power circuitry 1814. The battery/power circuitry 1814 may include one or more energy storage devices (e.g., batteries or capacitors) and/or circuitry for coupling components of the computing device 1800 to an energy source separate from the computing device 1800 (e.g., AC line power).

The computing device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display, for example.

The computing device 1800 may include an audio output device 1808 (or corresponding interface circuitry, as discussed above). The audio output device 1808 may include any device that generates an audible indicator, such as speakers, headsets, or earbuds, for example.

The computing device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The computing device 1800 may include a GPS device 1818 (or corresponding interface circuitry, as discussed above). The GPS device 1818 may be in communication with a satellite-based system and may receive a location of the computing device 1800, as known in the art.

The computing device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The computing device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1800 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1800 may be any other electronic device that processes data.

Select Examples

The following paragraphs provide various examples of the embodiments disclosed herein.

Example 1 provides an IC assembly including a first optical layer including a first waveguide formed of a substantially monocrystalline material, the first optical layer having a front face; a second optical layer including a second waveguide, the second optical layer having a back face; and a bonding layer between the front face of the first optical layer and the back face of the second optical layer, the bonding layer having a bonding material having a lower crystallinity than the first waveguide.

Example 2 provides the IC assembly according to example 1, where the first waveguide has a grain size of at least 5 nanometers, e.g., at least 100 nanometers.

Example 3 provides the IC assembly according to example 1 or 2, where the second waveguide includes a substantially monocrystalline material having a grain size of at least 5 nanometers, e.g., at least 100 nanometers.

Example 4 provides the IC assembly according to any of the preceding examples, where the bonding layer is a polycrystalline material.

Example 5 provides the IC assembly according to example 4, where the bonding layer has a grain size between 1 and 20 nanometers, e.g., between 5 nm and 10 nm.

Example 6 provides the IC assembly according to any of examples 1 through 3, where the bonding layer is an amorphous material.

Example 7 provides the IC assembly according to any of the preceding examples, where the first optical layer further includes a second monocrystalline material, the second monocrystalline material having a different refractive index from the first monocrystalline material.

Example 8 provides the IC assembly according to any of the preceding examples, where the first optical layer further includes a second monocrystalline material, the second monocrystalline material different from the first monocrystalline material.

Example 9 provides the IC assembly according to any of the preceding examples, where the first waveguide includes silicon.

Example 10 provides the IC assembly according to any of examples 1 through 8, where the first waveguide includes sapphire.

Example 11 provides the IC assembly according to any of examples 1 through 8, where the first waveguide includes quartz.

Example 12 provides the IC assembly according to any of examples 1 through 8, where the first waveguide includes indium and phosphorous.

Example 13 provides the IC assembly according to any of examples 1 through 8, where the first waveguide includes germanium.

Example 14 provides the IC assembly according to any of examples 1 through 8, where the first optical layer includes arsenic III.

Example 15 provides the IC assembly according to any of the preceding examples, where the first waveguide in the first optical layer extends in a first direction (e.g., in an x-direction), and the second waveguide in the second optical layer extends in a second direction substantially perpendicular to the first direction (e.g., in a y-direction).

Example 16 provides the IC assembly according to any of the preceding examples, further including an optical via that extends through the bonding layer and couples the first waveguide to the second waveguide.

Example 17 provides the IC assembly according to any of the preceding examples, the first optical layer further including a second substantially monocrystalline material, and the first waveguide is formed over the second substantially monocrystalline material.

Example 18 provides the IC assembly according to example 17, where the second optical layer further including a third substantially monocrystalline material, and the second waveguide is formed over the third substantially monocrystalline material.

Example 19 provides the IC assembly according to example 17 or 18, where third substantially monocrystalline material is bonded over the bonding material.

Example 20 provides the IC assembly according to any of examples 1 through 16, where the first optical layer further includes an isolation layer, and the bonding layer bonds the second waveguide to the isolation layer.

Example 21 provides the IC assembly according to example 20, further including a support layer and a second bonding layer, the second bonding layer between the first waveguide and the support layer.

Example 22 provides the IC assembly according to example 20, further including a support layer, where the first waveguide is formed over the support layer.

Example 23 provides the IC assembly according to example 20, where the first optical layer includes a second bonding layer, the second bonding layer between the isolation layer and the first waveguide.

Example 24 provides an IC assembly including a first optical layer including a first optical waveguide, the first optical waveguide formed from a first crystalline material having a grain size of at least 20 nanometers; a second optical layer including a second optical waveguide, second optical waveguide formed from a second crystalline material having a grain size of at least 20 nanometers; and a bonding layer between the first optical layer and the second optical layer, the bonding layer including a bonding material having a lower crystallinity than the first optical waveguide and the second optical waveguide.

Example 25 provides the IC assembly according to example 24, where the first crystalline material and the second crystalline material are a same material.

Example 26 provides the IC assembly according to example 24, where the first crystalline material and the second crystalline material are different materials.

Example 27 provides the IC assembly according to example 24, where the first crystalline material includes silicon.

Example 28 provides the IC assembly according to example 27, where the second crystalline material includes silicon.

Example 29 provides the IC assembly according to example 27, where the second crystalline material includes one of sapphire, quartz, indium, phosphorous, germanium, and arsenic III.

Example 30 provides the IC assembly according to example 24, where the first crystalline material includes one of sapphire, quartz, indium, phosphorous, germanium, and arsenic III.

Example 31 provides the IC assembly according to any of examples 24-30, where the bonding layer is a polycrystalline material.

Example 32 provides the IC assembly according to example 31, where the bonding layer has a grain size of no more than 20 nanometers, e.g., between 5 and 10 nanometers.

Example 33 provides the IC assembly according to any of examples 24 through 32, where the bonding layer is an amorphous material.

Example 34 provides a method including implanting an upper portion of a waveguide material with an implant material, the first waveguide material having an upper face and a lower face, where the first waveguide material is a substantially monocrystalline material; attaching the upper face of the waveguide material to a carrier structure; bonding the lower face of the waveguide material to a support layer with a bonding material, the bonding material including an amorphous or polycrystalline material; removing the upper portion of the waveguide material and the carrier structure; and forming at least one optical waveguide in the waveguide material.

Example 35 provides the method according to example 34, where the implant material is an electrically inactive material.

Example 36 provides the method according to example 35, where the implant material includes hydrogen.

Example 37 provides the method according to example 35, where the implant material includes one or helium, ammonium, and nitrogen.

Example 38 provides the method according to any of examples 34 to 37, where implanting the upper portion of the waveguide material with the implant material alters a crystal structure of the upper portion of the waveguide material.

Example 39 provides the method according to any of examples 34 to 38, where removing the upper portion of the waveguide material and the carrier structure includes grinding the upper portion of the waveguide material and the carrier structure.

Example 40 provides the method according to any of examples 34 to 38, where removing the upper portion of the waveguide material and the carrier structure includes breaking off the upper portion of the waveguide material and the carrier structure from the support layer and a remaining portion of the waveguide material.

Example 41 provides the method according to any of examples 34-40, further including bonding an isolation layer to the waveguide material.

Example 42 provides the method according to any of examples 34-40, further including depositing an isolation layer over the waveguide material.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. An integrated circuit (IC) assembly, comprising:
   a first optical layer comprising a first waveguide formed of a substantially monocrystalline material, the first optical layer having a front face;

a second optical layer comprising a second waveguide, the second optical layer having a back face; and a bonding layer between the front face of the first optical layer and the back face of the second optical layer, the bonding layer comprising a bonding material having a lower crystallinity than the first waveguide.

2. The IC assembly according to claim 1, wherein the first waveguide has a grain size of at least 5 nanometers.

3. The IC assembly according to claim 1, wherein the second waveguide comprises a substantially monocrystalline material having a grain size of at least 5 nanometers.

4. The IC assembly according to claim 1, wherein the bonding layer is a polycrystalline material.

5. The IC assembly according to claim 4, wherein the bonding layer has a grain size between 1 and 20 nanometers.

6. The IC assembly according to claim 1, wherein the bonding layer is an amorphous material.

7. The IC assembly according to claim 1, wherein the first optical layer further comprises a second monocrystalline material, the second monocrystalline material having a different refractive index from the monocrystalline material.

8. The IC assembly according to claim 1, wherein the first optical layer further comprises a second monocrystalline material, the second monocrystalline material different from the monocrystalline material.

9. The IC assembly according to claim 1, wherein the first waveguide in the first optical layer extends in a first direction, and the second waveguide in the second optical layer extends in a second direction substantially perpendicular to the first direction.

10. The IC assembly according to claim 1, the first optical layer further comprising a second substantially monocrystalline material, and the first waveguide is formed over the second substantially monocrystalline material.

11. The IC assembly according to claim 10, wherein the second optical layer further comprising a third substantially monocrystalline material, and the second waveguide is formed over the third substantially monocrystalline material.

12. The IC assembly according to claim 10, wherein third substantially monocrystalline material is bonded over the bonding material.

13. The IC assembly according to claim 1, wherein the first optical layer further comprises an isolation layer, and the bonding layer bonds the second waveguide to the isolation layer.

14. The IC assembly according to claim 13, further comprising a support layer and a second bonding layer, the second bonding layer between the first waveguide and the support layer.

15. The IC assembly according to claim 13, wherein the first optical layer comprises a second bonding layer, the second bonding layer between the isolation layer and the first waveguide.

16. An integrated circuit (IC) assembly, comprising:
a first optical layer comprising a first optical waveguide, the first optical waveguide formed from a first crystalline material having a grain size of at least 20 nanometers;
a second optical layer comprising a second optical waveguide, second optical waveguide formed from a second crystalline material having a grain size of at least 20 nanometers; and
a bonding layer between the first optical layer and the second optical layer, the bonding layer comprising a bonding material having a lower crystallinity than the first optical waveguide and the second optical waveguide.

17. The IC assembly of claim 16, wherein the first crystalline material and the second crystalline material are a same material.

18. The IC assembly according to claim 16, wherein the bonding layer has a grain size of no more than 20 nanometers.

19. A method comprising:
implanting an upper portion of a waveguide material with an implant material, the waveguide material having an upper face and a lower face, wherein the waveguide material is a substantially monocrystalline material;
attaching the upper face of the waveguide material to a carrier structure;
bonding the lower face of the waveguide material to a support layer with a bonding material, the bonding material comprising an amorphous or polycrystalline material;
removing the upper portion of the waveguide material and the carrier structure; and
forming at least one optical waveguide in the waveguide material.

20. The method of claim 19, wherein implanting the upper portion of the waveguide material with the implant material alters a crystal structure of the upper portion of the waveguide material.

\* \* \* \* \*